(12) United States Patent
Goldberg

(10) Patent No.: US 7,098,849 B2
(45) Date of Patent: Aug. 29, 2006

(54) BLIND SIGNAL SEPARATION USING ARRAY DEFLECTION

(75) Inventor: Steven J. Goldberg, Downingtown, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 11/233,160

(22) Filed: Sep. 22, 2005

(65) Prior Publication Data

US 2006/0069530 A1    Mar. 30, 2006

Related U.S. Application Data

(60) Provisional application No. 60/612,546, filed on Sep. 23, 2004, provisional application No. 60/612,435, filed on Sep. 23, 2004, provisional application No. 60/612,433, filed on Sep. 23, 2004, provisional application No. 60/612,550, filed on Sep. 23, 2004, provisional application No. 60/612,632, filed on Sep. 23, 2004, provisional application No. 60/612,548, filed on Sep. 23, 2004, provisional application No. 60/612,471, filed on Sep. 23, 2004, provisional application No. 60/612,551, filed on Sep. 23, 2004, provisional application No. 60/612,469, filed on Sep. 23, 2004, provisional application No. 60/612,547, filed on Sep. 23, 2004, provisional application No. 60/615,338, filed on Oct. 1, 2004, provisional application No. 60/615,260, filed on Oct. 1, 2004, provisional application No. 60/620,775, filed on Oct. 20, 2004, provisional application No. 60/620,776, filed on Oct. 20, 2004, provisional application No. 60/620,862, filed on Oct. 20, 2004, provisional application No. 60/621,113, filed on Oct. 22, 2004, provisional application No. 60/639,223, filed on Dec. 23, 2004.

(51) Int. Cl.
*H01Q 3/00* (2006.01)

(52) U.S. Cl. ...................... 342/383; 342/377

(58) Field of Classification Search ............... 342/373, 342/377–378, 380, 382–383
See application file for complete search history.

(56) References Cited

U.S. PATENT DOCUMENTS

| 6,473,036 B1 | 10/2002 | Proctor, Jr. ................. 342/372 |
| 6,799,170 B1 | 9/2004 | Lee et al. ..................... 706/20 |

(Continued)

OTHER PUBLICATIONS

R. Klukas et al., Line-of-sight angle of arrival estimation in the outdoor multipath environment, IEEE Transactions on Vehicular Technology, vol. 47(1), p. 342-351, Feb. 1998.*

*Primary Examiner*—Thomas H. Tarcza
*Assistant Examiner*—Fred H Mull
(74) *Attorney, Agent, or Firm*—Allen, Dyer, Doppelt, Milbrath & Gilchrist, P.A.

(57) ABSTRACT

A communications device for separating source signals provided by M signal sources includes an antenna array comprising N antenna elements for generating N initial antenna patterns for receiving N different summations of the M source signals, with N being less than M. The antenna array includes an elevation controller for selectively changing an elevation of at least one of the N initial antenna patterns for generating at least one additional antenna pattern so that at least one additional different summation of the M source signals is received thereby. A blind signal separation processor forms a mixing matrix comprising the N different summations of the M source signals, and the at least one additional different summation of the M source signals. The mixing matrix has a rank equal to N plus the number of additional different summations of the M source signals received using the additional antenna patterns. The blind signal separation processor separates desired source signals from the mixing matrix.

31 Claims, 15 Drawing Sheets

U.S. PATENT DOCUMENTS

| | | | |
|---|---|---|---|
| 6,931,362 B1 | 8/2005 | Beadle et al. | 702/190 |
| 2001/0033248 A1* | 10/2001 | Owechko | 342/371 |
| 2004/0247054 A1* | 12/2004 | Ferreol et al. | 375/340 |

* cited by examiner

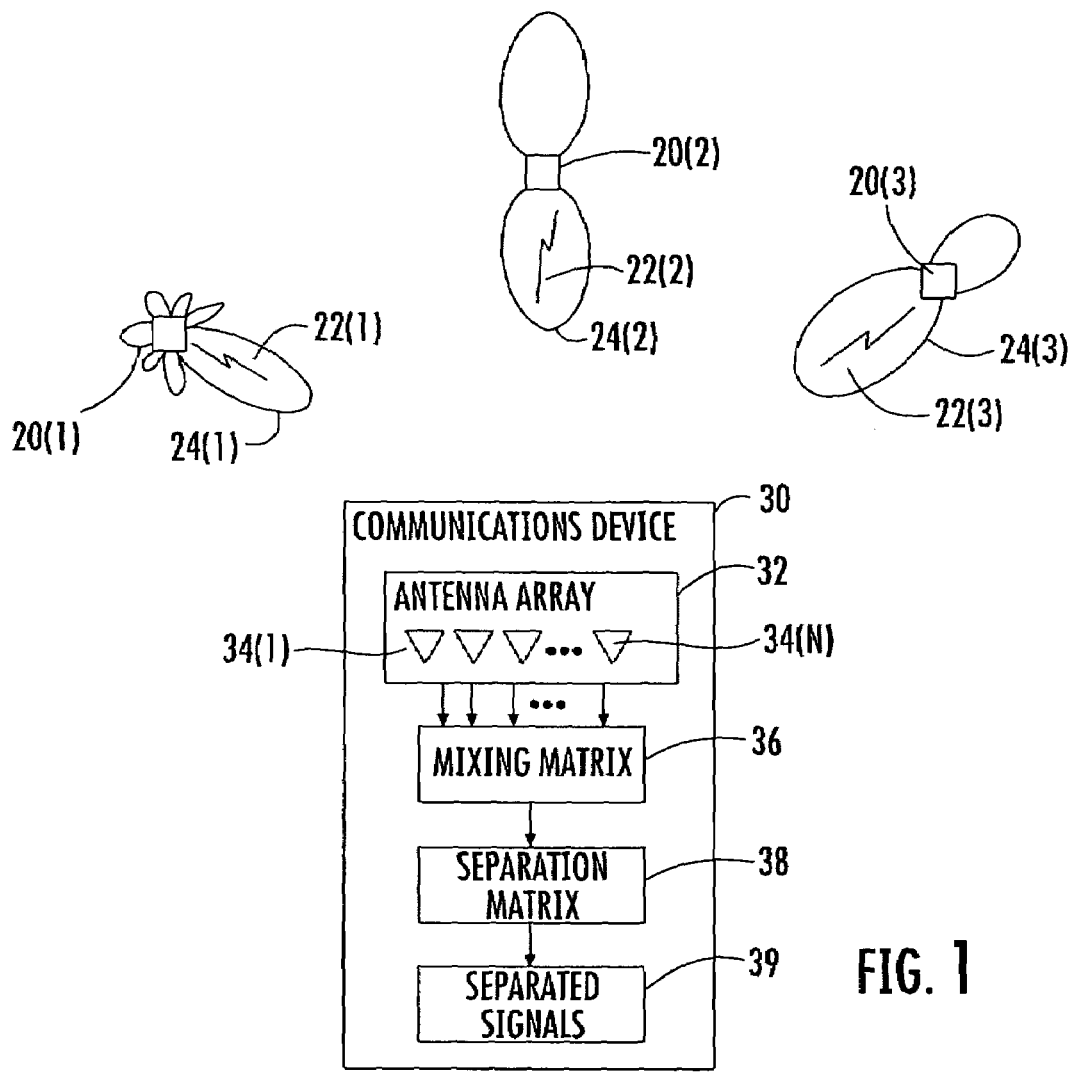
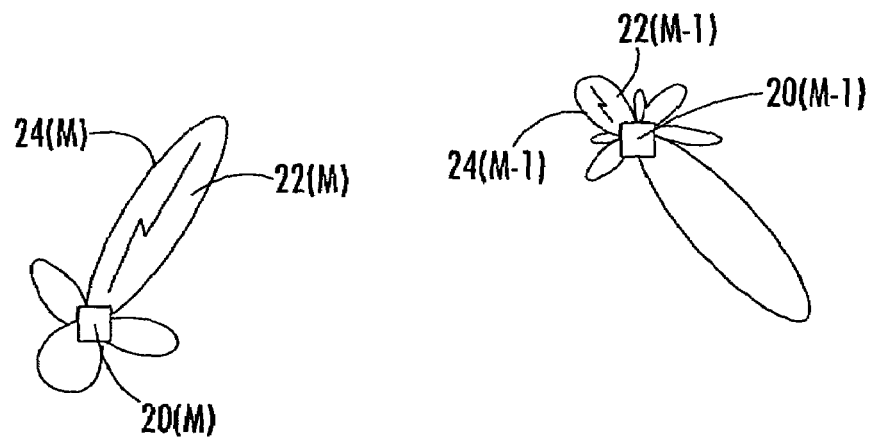
FIG. 1

BLIND SIGNAL SEPARATION USING ARRAY DEFLECTION

RELATED APPLICATIONS

This application claims the benefit of U.S. Provisional Application Ser. Nos. 60/612,546 filed Sep. 23, 2004; 60/612,435 filed Sep. 23, 2004; 60/612,433 filed Sep. 23, 2004; 60/612,550 filed Sep. 23, 2004; 60/612,632 filed Sep. 23, 2004; 60/612,548 filed Sep. 23, 2004; 60/612,471 filed Sep. 23, 2004; 60/612,551 filed Sep. 23, 2004; 60/612,469 filed Sep. 23, 2004; 60/612,547 filed Sep. 23, 2004; 60/615,338 filed Oct. 1, 2004; 60/615,260 filed Oct. 1, 2004; 60/620,775 filed Oct. 20, 2004; 60/620,776 filed Oct. 20, 2004; 60/620,862 filed Oct. 20, 2004; 60/621,113 filed Oct. 22, 2004; and 60/639,223 filed Dec. 23, 2004 the entire contents of which are incorporated herein by reference.

FIELD OF THE INVENTION

The present invention relates to the field of signal processing, and more particularly, to separating desired source signals from a mixture of source signals using blind signal separation (BSS) techniques.

BACKGROUND OF THE INVENTION

Blind source separation (BSS) involves recovering source signals from a composite signal, wherein the composite signal includes a mixture of the source signals. The separation is "blind" because it is often performed with limited information about the signals, the sources of the signals, and the effects that the propagation channel has on the signals.

An example is the familiar "cocktail party" effect when a person at a party is able to separate a single voice from a combination of all the voices in the room. Blind source separation is particularly applicable to cellular and personal wireless communications devices, where many frequency bands have become cluttered with numerous radio frequency emitters, often co-existing in the same spectrum. The problem of co-channel emitters is expected to only worsen in years to come with the development of low power, unlicensed wireless technologies such as Bluetooth and other personal area networks.

Three commonly used blind signal separation techniques are principal component analysis (PCA), independent component analysis (ICA) and singular value decomposition (SVD). PCA involves first and second moment statistics of the source signals, and is used when the signal-to-noise ratios of the source signals are high. Otherwise, ICA is used which involves PCA processing followed by third and fourth moment statistics of the source signals. As an alternative, SVD may be used to separate a source signal from the mixture of source signals based upon their eigenvalues.

Regardless of the blind signal separation technique that is applied, a plurality of sensors is used to receive different mixtures of the source signals from the various signal sources. Each sensor outputs a mixture of the source signals, which is a unique sum of the source signals. In general, both the channel coefficients and the original source signals are unknown to the receiver. The unique sums of signals are used to populate a mixing matrix. The appropriate blind signal separation technique is then applied to the mixing matrix for separating desired source signals from the mixture of source signals.

As an example, U.S. Pat. No. 6,799,170 discloses the separation of an independent source signal from a mixture of source signals using ICA. A plurality of sensors receive the mixture of source signals, and a processor takes samples of the mixture of source signals over time and stores each sample as a data vector to create a data set. Each sensor outputs a mixture of the source signals, which is a unique sum of the source signals. An ICA module performs an independent component analysis of the data vectors to separate an independent source signal from other signals in the mixture of source signals.

The sensors are spatially separated from one another, and the processor generates only one data vector for each respective sensor to create the data set. The '170 patent also discloses that the number of sensors N is equal to or greater than the number of sources M, i.e., $N \geq M$ for populating the data set. A problem with such an implementation is that as the number of sources M increases, then so does the number of sensors N. Small portable communications devices have little available volume for a large number of sensors N, and mounting the sensors on the outside of the communications devices is a problem for the users.

U.S. Pat. No. 6,931,362 discloses another method for separating signals using blind signal separation. The disclosed blind signal separation technique forms a mixing matrix with hybrid matrix-pencil adaptive array weights that minimize the mean squared errors due to both interference emitters and Gaussian noise. The hybrid weights maximize the signal to interference plus noise ratio. As with the '170 patent, the sensors are also spatially separated from one another, and the number of sensors N is equal to or greater than the number of sources M for populating the mixing matrix. Moreover, each sensor provides a single input to the mixing matrix resulting in a larger volume area for a portable communications device.

SUMMARY OF THE INVENTION

In view of the foregoing background, it is therefore an object of the present invention to provide a communications device comprising a compact antenna array for receiving a mixture of source signals for use by blind signal separation techniques so that desired source signals can be separated therefrom.

This and other objects, features, and advantages in accordance with the present invention are provided by a communications device for separating source signals provided by M signal sources, with the communications device comprising an antenna array for receiving different summations of the M source signals. A receiver or receiver assembly is connected to the antenna array, and a blind signal separation processor is connected to the receiver for forming a mixing matrix. The mixing matrix comprises the different summations of the M source signals as received by the antenna array. The blind signal separation processor then separates desired source signals from the mixing matrix.

Instead of using spatially separated sensors to provide the different summations of the M source signals for the mixing matrix, a compact antenna array may be used instead. For portable communications devices, blind signal separation techniques may be used since the antenna array provides more than one input to the mixing matrix while remaining compact.

In particular, array deflection may be used for providing different summations of signals for blind signal separation processing. Array deflection involves controlling antenna patterns in the azimuth and/or elevation direction. An advantage of array deflection is that more signals can be received for the mixing matrix without having to increase the number of antenna elements in the antenna array.

The antenna array may comprise N antenna elements for generating N initial antenna patterns for receiving N different summations of the M source signals, with N being less than M. The antenna array may comprise an elevation controller for selectively changing an elevation of at least one of the N initial antenna patterns for generating at least one additional antenna pattern so that at least one additional different summation of the M source signals is received thereby.

A receiver may be connected to the antenna array for receiving the N different summations of the M source signals using the N initial antenna patterns, and for receiving the at least one additional different summation of the M source signals using the at least one additional antenna pattern. A blind signal separation processor forms a mixing matrix comprising the N different summations of the M source signals and the at least one additional different summation of the M source signals, and separates desired source signals from the mixing matrix. The mixing matrix may have a rank equal to N plus the number of additional different summations of the M source signals received using the additional antenna patterns.

The elevation controller may selectively change the elevation of the N initial antenna patterns so that N additional antenna patterns are generated for receiving N additional different summations of the M source signals, with the rank of the mixing matrix now being equal to 2N.

The elevation controller may also be segmented into k regions relative to the N antenna elements, with each region being independently controlled for changing the elevation of the N initial antenna patterns so that N additional antenna patterns are generated for receiving N additional different summations of the M source signals. The rank of the mixing matrix may now be equal to 2 kN.

The antenna elements may be configured so that they have the same or different polarization, and they may be configured so that they are correlated or uncorrelated. In one embodiment, N antenna elements are correlated. The N correlated antenna elements may comprise N active antenna elements so that the antenna array forms a phased array. Alternatively, the N correlated antenna elements may comprise at least one active antenna element, and up to N-1 passive antenna elements so that the antenna array forms a switched beam antenna.

In one embodiment, the antenna array comprises a ground plane, and the N antenna elements comprise an active antenna element adjacent the ground plane, and a plurality of passive antenna elements adjacent the ground plane. Each passive antenna element may comprise an upper half and a corresponding lower half, and an upper variable reactive load connecting the upper half to the ground plane for changing an antenna pattern in azimuth. The elevation controller may comprise a respective lower variable reactive load for each passive antenna element for connecting the lower half to the ground plane. The N antenna patterns may be moved in elevation by adjusting at least one of the lower variable reactive loads.

In yet another embodiment, the antenna array comprises a ground plane adjacent the N antenna elements, and the elevation controller comprises a controllable RF choke coupled to the ground plane. The N antenna beams may be moved in elevation by controlling the RF choke.

A distinction may be made between patterns and beams when receiving the different summations of the M source signals. In one case, the antenna array may form at least N antenna beams for receiving the at least N different summations of the M source signals, with each antenna beam having 3 db points down from a maximum gain point thereof providing for signal rejection in at least one direction of an approaching signal. In another case, the antenna array may form at least one antenna pattern for receiving at least one of the N different summations of the M source signals, with the at least one antenna pattern having substantially no 3 db points down from a maximum gain point thereof resulting in no signal rejection in any direction of an approaching signal.

Each summation of the M source signals is linear. The blind signal separation processor may separate the desired source signals from the mixing matrix based on at least one of principal component analysis (PCA), independent component analysis (ICA) and single value decomposition (SVD).

Another aspect of the present invention is directed to a method for operating the communications device as defined above for separating source signals provided by the M signal sources.

BRIEF DESCRIPTION OF THE DRAWINGS

FIG. 1 is a block diagram of a typical operating scenario in which a communications device receives desired and undesired signals from their respective signal sources in accordance with the present invention.

DETAILED DESCRIPTION OF THE PREFERRED EMBODIMENTS

Figure 2:
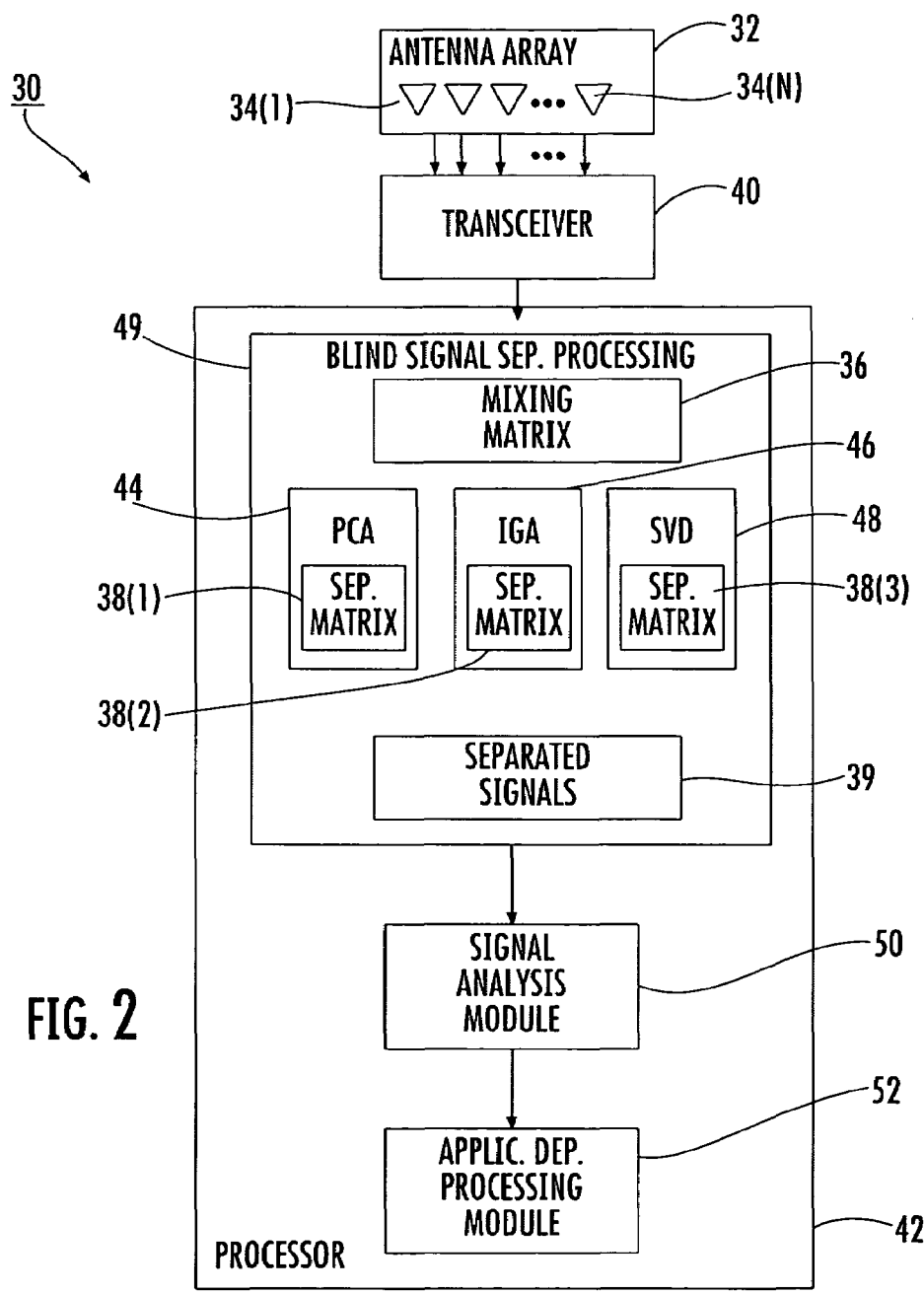
FIG. 2 is a more detailed block diagram of the communications device shown in FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

In communications networks there are source signals intended for a specific communications device, and there are source signals intended for other communications devices operating within the same frequency band. There are also sources of noise which produce signals that are not used for communications, but are received by the communications devices as well.

To facilitate decoding of the source signals of interest, blind signal separation is used to separate the signals received by a communications device. As noted above, the term "blind" refers to the fact that in an ideal case the signals can be separated without any knowledge about the nature of the signals or the transformations that occur due to interactions between the signals and the communication channel. In practical implementations, any knowledge that is available is often exploited. In this case, the signal separation is semi-blind.

Three commonly used techniques that fall under blind signal separation are principal component analysis (PCA), independent component analysis (ICA), and singular value decomposition (SVD). As long as the signals are independent in some measurable characteristic, and if their signal sums are linearly independent from each other, one or more of these blind signal separation techniques may be used to separate independent or desired source signals from a mixture of the source signals. The measurable characteristic is often some combination of the first, second, third or fourth moments of the signals.

PCA whitens the signals, uses first and second moments, and rotates the data set based on correlation properties. If the signal-to-noise ratios of the source signals are high, the signal separation process can stop with PCA.

If the signal-to-noise ratios of the source signals are low, then ICA separates the source signals based on statistical attributes involving the third and fourth moments of the source signals. Since the source signals are Gaussian, their third and fourth moments are dependent on the first and second moments. As an alternative to ICA and PCA, SVD separates source signals from the mixture of source signals based upon their eigenvalues.

A typical scenario is illustrated in FIG. 1, in which a plurality of signal sources 20 transmit source signals 22. The source signals 22 are transmitted in a direction based upon generated antenna beams 24 associated with each respective signal source 20. The plurality of signal sources 20 include a first signal source 20(1) through an Mth signal source 20(M). Likewise, the respective source signals are referenced 22(1)–22(M) and the corresponding antenna beams are referenced 24(1)–24(M). More straightforward implementations are often utilized in communications networks in the form of omni-directional antenna patterns or directional antenna patterns.

An antenna array 32 for the communications device 30 receives a linear combination (mixture) of the source signals 22 from the signal sources 20. The antenna array 32 comprises a plurality of antenna elements 34, with each antenna element providing at least one linear combination (mixture) of the source signals 22 from the signal sources 20. The antenna elements 34 include a first antenna element 34(1) through an Nth antenna element 34(N).

The received source signals 22(1)–22(M) are initially formed into a mixing matrix 36. The communications device 30 uses blind signal separation techniques to determine a separation matrix 38 for separating the source signals in the mixing matrix. The separated signals are represented by reference 39

The communications device 30 jointly extracts the mixture of source signals received by the antenna array 32 by sampling an aggregate or composite of the received source signals without knowledge of their characteristics. The output of each antenna element 34 is modeled as a summation of the source signals 22 after having been convolved with the impulse response of the channel, i.e., the propagation path between the output of a signal source 20 and the output of an antenna element 34 plus additive Gaussian noise.

The communications device 30 for separating source signals provided by the M signal sources 20(1)–20(M) will now be discussed in greater detail with reference to FIG. 2. An antenna array 34 includes N antenna elements 34(1)–34(N) for receiving up to at least N different summations of the M source signals, with N and M being greater than 1. The antenna array 32 is not limited to any particular configuration. The antenna array 32 may include one or more antenna elements 34. The antenna elements 34 may be configured so that the antenna array 32 forms a phased array or switched beam antenna, for example, as will be discussed in greater below.

A transceiver 40 is connected downstream to the antenna array 32 for receiving up to the at least N different summations of the M source signals 22. A processor 42 is downstream to the transceiver 40. Even though the processor 42 is illustrated separate form the transceiver 40, the processor may also be included within the transceiver. The different summations of the M source signals 22 received by the transceiver 40 are used to populate the mixing matrix 36. The mixing matrix 36 is then processed by one or more blind signal separation processing modules 44, 46 and 48 within the processor 42.

The blind signal separation processing modules include a PCA module 44, an ICA module 46 and an SVD module 48. These modules 44, 46 and 48 may be configured as part of a blind signal separation processor 49. The PCA module 44 operates based on the first and second moments of the different summations of the received source signals, whereas the ICA module 46 operates based on the third and fourth moments of the same signals. The SVD module 48 performs signal separation based on the eigenvalues of the different summations of the received source signals.

The correlation processing initially performed by the PCA module 44 determines an initial separation matrix 38(1) for the different summations of the source signals, and the ICA module 46 then determines an enhanced separation matrix 38(2) for separating the source signals in the mixing matrix 36. If the signals are separated by the SVD module 48, a separation matrix 38(3) is also determined for separating the different summations of the received source signals in the mixing matrix 36.

From each respective separation matrix 38(1)–38(3), the separated signals are represented by reference number 39. The separated signals 39 then they undergo signal analysis by a signal analysis module 50 to determine which signals are of interest and which signals are interferers. An application dependent processing module 52 processes the signals output from the signal analysis module 50.

The decision on which signals are of interest may not always involve the final signal to be decoded. For instance, the application may call for identifying interferers and subtracting them from the different summations of the received source signals, and then feeding the reduced signal to a waveform decoder. In this case, the signals of interest are the ones that ultimately end up being rejected.

The information fed to the PCA module 44 is a unique sum of signals $x_j$. It is assumed that N linear mixtures $x_1, \ldots, x_N$ of M independent components are observed:

$$x_1(t) = a_{11}s_1(t) + \ldots a_{1k}s_k(t) + \ldots a_{1M}s_M(t):$$

$$x_j(t) = a_{j1}s_1(t) + \ldots a_{jk}s_k(t) + \ldots a_{jM}s_M(t):$$

$$x_N(t) = a_{N1}s_1(t) + \ldots a_{Nk}s_k(t) + \ldots a_{NM}s_M(t)$$

In general, both the channel coefficients $a_{jk}$ and the original signals $s_k$ are unknown to the transceiver 40. In matrix notation the above set of equations may be compactly written as x=As, where A is the mixing matrix. The statistical model x=As is also known as the ICA model. Traditional techniques try to find the inverse of the channel: $s = A^{-1}x$.

The ICA module 46 determines a separation matrix W, and y=W(As)=Wx. The vector y is a subset of s in unknown order with scaling changes. If all the signals are not separable, the more general form would be y=W(As)+Wn=Wx+Wn, where the additional n term is the residual noise due to the unidentifiable sources.

The ICA model is a generative model, which means that it describes how the observed data is generated by a process of mixing the components $s_k$. The independent components are latent variables, meaning that they cannot be directly observed. Also, the mixing matrix A is assumed to be unknown. All that is observed is the random vector x, and A and s are to be estimated based upon x.

The starting point of ICA is the assumption that the components $s_k$ are statistically independent. Moreover, it is assumed that the independent components $s_k$ at most have one with a Gaussian distribution. The one signal with a Gaussian distribution limitation is due to the fact that the third moment of a Gaussian signal is 0, and the forth moment is indistinguishable amongst Gaussian signals.

For simplicity, the unknown mixing matrix A is assumed to be square. Thus, the number of independent components is equal to the number of observed mixtures. However, this assumption can be relaxed at times. As long as the signals $s_k$ are statistically independent in some measurable characteristic, the separation matrix W can be determined.

The rank of the mixing matrix A determines how many signals can actually be separated. For example, a mixing matrix having a rank of 4 means that 4 source signals can be separated. Ideally, the rank of the mixing matrix A should at least be equal to the number of signal sources M. The larger the rank, the more signals that can be separated. As the number of sources M increases, then so does the required number of antenna elements N. The '170 and '362 patents discussed in the background section both disclose that the number of antenna elements N are equal to or greater than the number of signal sources M, i.e., N≧M., otherwise a technique other than blind signal separation is to be used to separate the signals.

An industry standard for creating the linearly independent sums of signals is to use N uncorrelated sensors, i.e., the sensors are spaced at least a wavelength apart from one another. The wavelength is based upon the operating frequency of the communications device 30. The N sensors are uncorrelated in space, but correlated in polarization and in angle. The N uncorrelated sensors provide N sums of linearly independent signals, where each sensor provides a single entry into the mixing matrix A.

Figure 3:
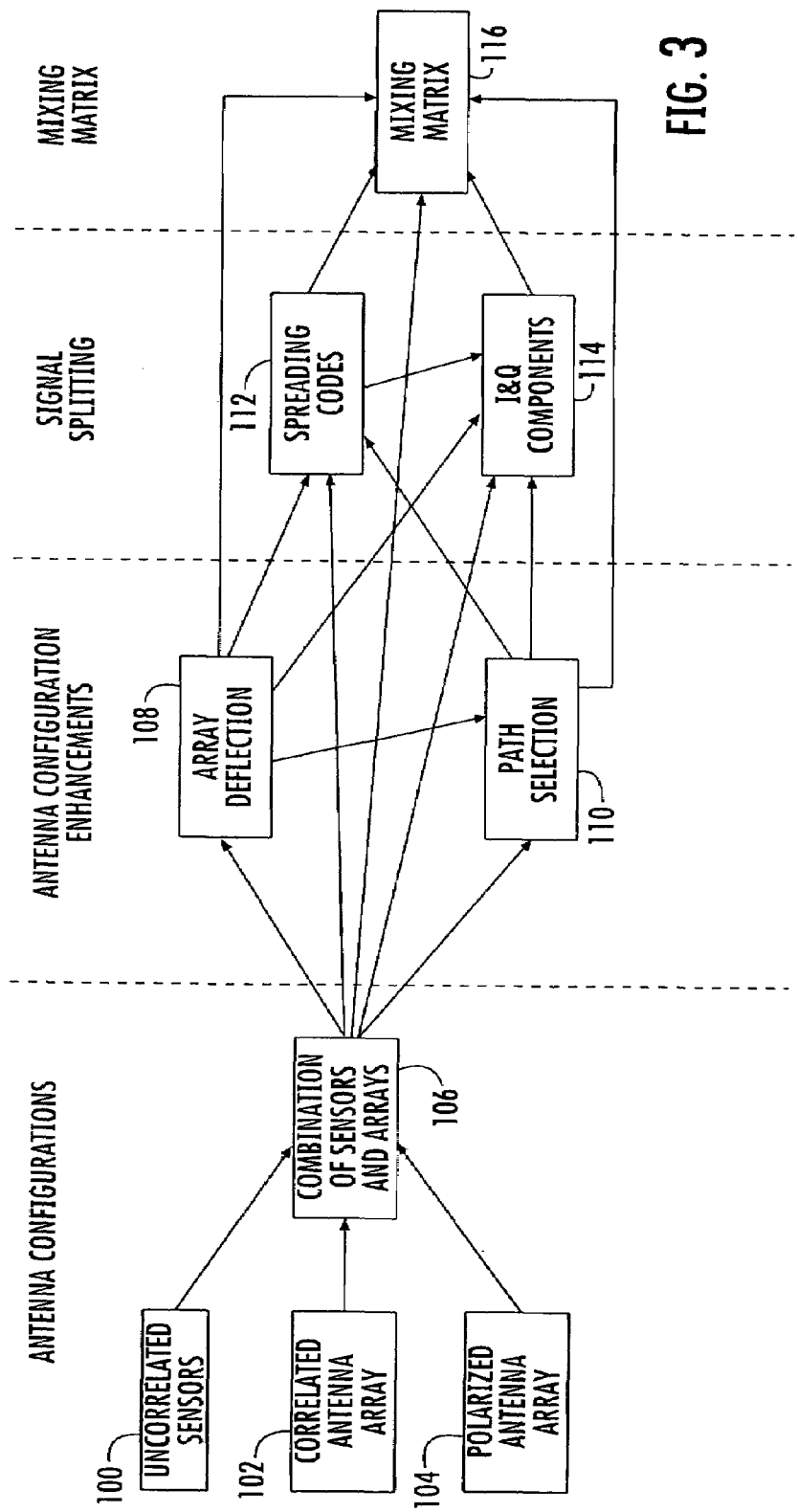
FIG. 3 is a roadmap of the different approaches for creating the linear independent summations of the source signals for the mixing matrix in accordance with the present invention.

A roadmap or outline of the different approaches for creating the linear independent summations of the source signals for the mixing matrix A will initially be discussed with reference to FIG. 3. After a brief introduction, each approach will be discussed in greater detail below.

The first section of the roadmap addresses antenna configurations. Block 100 represents uncorrelated sensors, wherein each sensor provides a single input to the mixing matrix A. Block 102 represents a correlated antenna array, wherein the array provides multiple inputs to populate the mixing matrix A. Block 104 also represents an antenna array, wherein a portion of the antenna elements is correlated and the antenna elements have different polarizations for populating the mixing matrix A. Different combinations of the sensors and antenna arrays addressed by Blocks 100, 102 and 104 may be combined in Block 106 to further populate the mixing matrix in Block 116.

The second section of the roadmap addresses enhancements to the antenna configurations provided in the first section. The enhancements are made so that additional or replacement summations of the source signals are collected to further populate the mixing matrix A. Block 108 involves array deflection in which the elevation of the antenna patterns is changed for receiving additional summations of the source signals. Anyone of the combinations in Block 106 may be used in the array deflection Block 108.

In Block 110, path selection is performed so that all of the summations of the source signals used to populate the mixing matrix A are correlated ($1^{st}$ and $2^{nd}$ moments) and/or statistically ($3^{rd}$ and $4^{th}$ moments) independent. In other words, the incident signals are selectively chosen for receiving new summations of the source signals to replace the summations that are not correlated and/or statistically independent. Block 110 may be fed by anyone of the combinations in Block 106 and 108. Blocks 108 and 110 may be fed directly to the mixing matrix Block 116.

The third section of the roadmap addresses signal splitting for further populating the mixing matrix in Block 116. For example, Block 112 splits the different summation signals using spreading codes. If a summation signal has k spreading codes, then that particular summation signal may be processed to provide k summation signals associated therewith. The spreading codes may be applied in combination with the outputs of Blocks 106, 108 and 110. Block 114 splits the different summation signals into in-phase (I) and quadrature (Q) components to further populate the mixing matrix. The I and Q components thus act as a multiplier of 2 for the missing matrix, and may be applied in combination with the outputs of Blocks 106, 108, 110 and 112.

The final section of the roadmap is the mixing matrix A formed in Block 116. As illustrated in the roadmap, the mixing matrix A may be populated with the different summations of the source signals based on anyone of the above described blocks. An advantage of the antenna array configurations in the first section is that compact antenna arrays may be formed for populating the mixing matrix A. An advantage of the antenna array configurations in the second and third sections is that N antenna elements, where N is less than the number M of source signals, can be used to populate the mixing matrix with M or more summations of the source signals.

Figure 4:
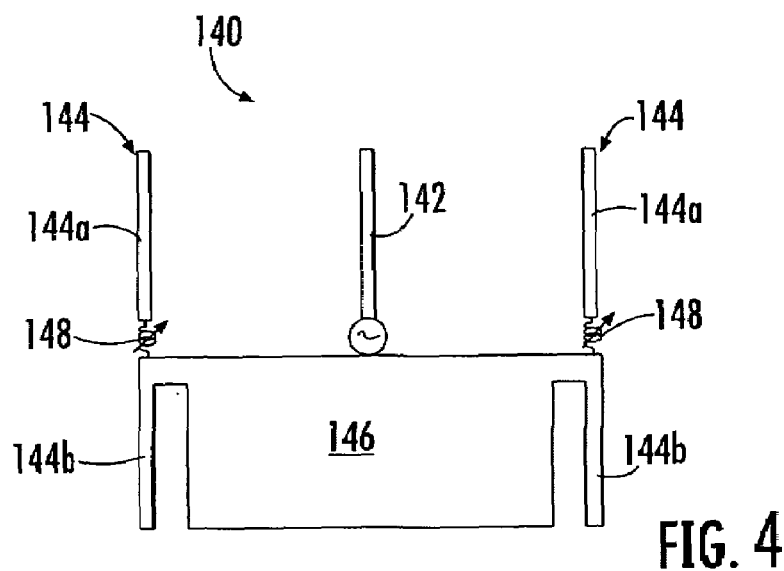
FIG. 4 is a block diagram of the antenna array configured as a switched beam antenna in accordance with the present invention.

In view of the antenna configurations discussed in the roadmap, an antenna array comprising N correlated antenna elements for receiving at least N different summations of the M source signals, with N and M being greater than 1, will be discussed. In one embodiment, the antenna array is a switched beam antenna 140 as illustrated in FIG. 4.

The switched beam antenna array 140 generates a plurality of antenna patterns, including directional antenna patterns and an omni-directional antenna pattern. The switched beam antenna 140 includes an active antenna element 142 and a pair of passive antenna elements 144. The actual number of active and passive antenna elements 142, 144 varies depending on the intended application. Reference is directed to U.S. patent application Ser. No. 11/065,752 for a more detailed discussion on the switched beam antenna array. This patent application is assigned to the current assignee of the present invention, the contents of which are incorporated herein by reference in its entirety.

Each passive antenna element 144 includes an upper half 144a and a lower half 144b. The upper halves 144a of the passive antenna elements 144 are connected to a ground plane 146 through reactive loads 148. The reactive loads 148 are a variable reactance, which is changeable in capacitance to inductance by using varactors, transmission lines or switching. By varying the reactive loads 148, the radiation patterns can be changed. Since there are two passive antenna elements 144, four different antenna patterns can be formed.

Three of the antenna patterns can be used to receive a unique sum of signals $x_j$. The fourth pattern is a linear combination of the other three, so it is not usable as an entry in the mixing matrix A. Consequently, with three antenna elements being utilized, three unique sum of signals $x_j$ are input to the mixing matrix A. An advantage of the switched beam antenna is that by using 3 elements 142 and 144, a mixing matrix of rank 3 can be supported.

Figure 5:
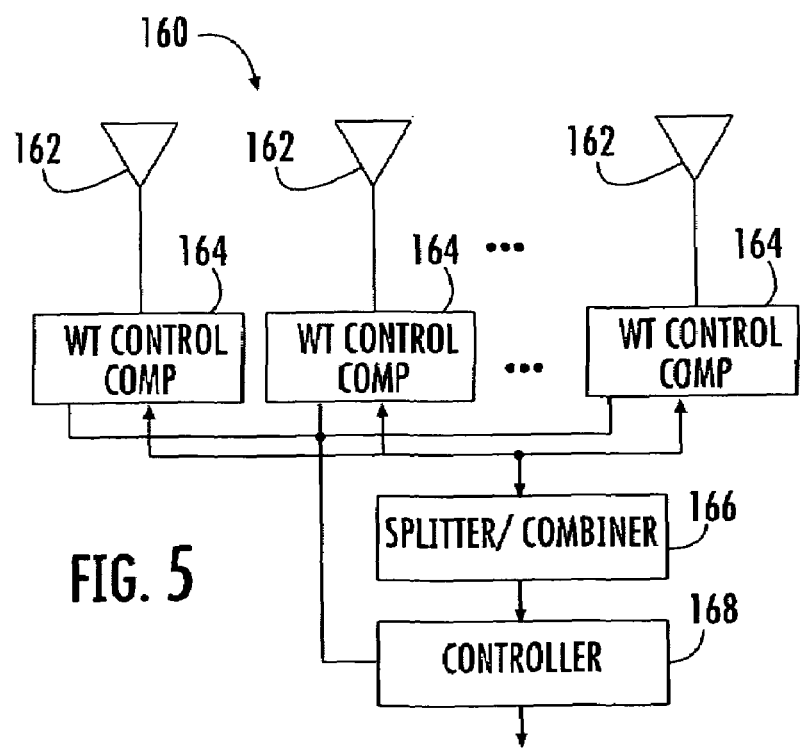
FIG. 5 is a block diagram of the antenna array configured as a phased array in accordance with the present invention.

In another embodiment, the antenna array comprises N correlated active antenna elements so that the antenna array forms a phased array 160, as illustrated in FIG. 5. The phased array 160 comprises a plurality of active antenna elements 162, and a plurality of weight control components 164 coupled to the active antenna elements. The weight control components 164 adjust the amplitude and/or phase of the received signals to form a composite beam.

A splitter/combiner 166 and a controller 168 are connected to the weight control components 164. Reference is directed to U.S. Pat. No. 6,473,036 for a more detailed discussion on the active array 160. This patent is assigned to the current assignee of the present invention, the contents of which are incorporated herein by reference in its entirety.

The number of active elements 162 supports a mixing matrix A having the same rank. Even though the number of sources M is equal to the number of active elements N, i.e., M=N, the active array 100 is compact since the active elements 162 are correlated in space and polarization, as compared to the traditional approach of using uncorrelated antenna elements that are spaced more than a wavelength apart.

In other embodiments, the rank of the mixing matrix may be K, where K<N, so that the blind signal separation processor 49 separates K of the M source signals from the mixing matrix. As will be discussed in greater detail below, N may also be greater than M.

In both the switched beam antenna 140 and the phased array 160, the distance between their respective antenna elements 142, 144 and 162 is set to allow a favorable back to front ratio. This is because the classical use of these antenna arrays is to reject unwanted signals (i.e., back approaching) and intensify wanted signals (i.e., front approaching).

However, for the purpose of building mixing matrices, the goal is create different sums of signals. The signals of interest can actually always be lower than the interferers in this application and still be separated. Because of this significant difference in purpose, the distances between antenna elements need not be of a specific separation.

The antenna elements could be further or closer together, generate patterns with classically 'bad' front to back ratios, and still be quite suitable for mixing matrix usage. If fact, such patterns will often be superior in the blind signal source separation application. The reason being that the use of good front to back ratios requires tracking of the signal directions in order to keep the front pointed at the desired signal and/or the back at interferers. By using patterns which have differences in various directions, but still significant gains, no such tracking of the signals is required.

An antenna beam may be defined as having 3 db points down from a maximum gain point thereof providing for signal rejection in at least one direction of signal approach. Similarly, an antenna pattern may be defined as having substantially no 3 dB points down from a maximum gain point thereof and having no signal rejection in any direction of signal approach.

In many applications this deviation from specific distances between elements can greatly reduce the size of the overall antenna array. In other applications it might actually be desirable to increase the distance between elements to alleviate the tracking problem, but gain some degree of additional signal decorrelation.

Figure 6:
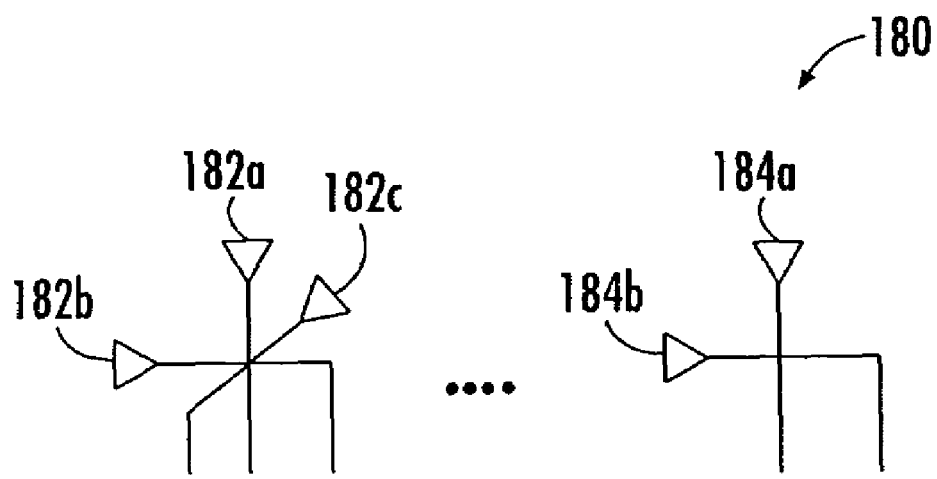
FIG. 6 is a block diagram of the antenna array configured with polarized antenna elements in accordance with the present invention.

In another embodiment, the antenna array 180 comprises N antenna elements for receiving at least N different summations of the M source signals, as illustrated in FIG. 6. At least two of the N antenna elements 182a, 182b are correlated and have different polarizations for receiving at least two of the N different summations of the M source signals, with N and M being greater than 1.

The other antenna elements 184a, 184b in the array 180 may be correlated or uncorrelated with respect to antenna elements 182a, 182b. Even though another pair of polarized antenna elements 184a, 184b are illustrated, these elements may instead have the same polarization. Moreover, these elements may also be uncorrelated with one another.

The different polarizations for antenna elements 182a, 182b may be orthogonal to one another. In another configuration, the antenna elements 182a, 182b include a third element 182c so that tri-polarization is supported for receiving 3 different summations of the M source signals.

Figure 7:
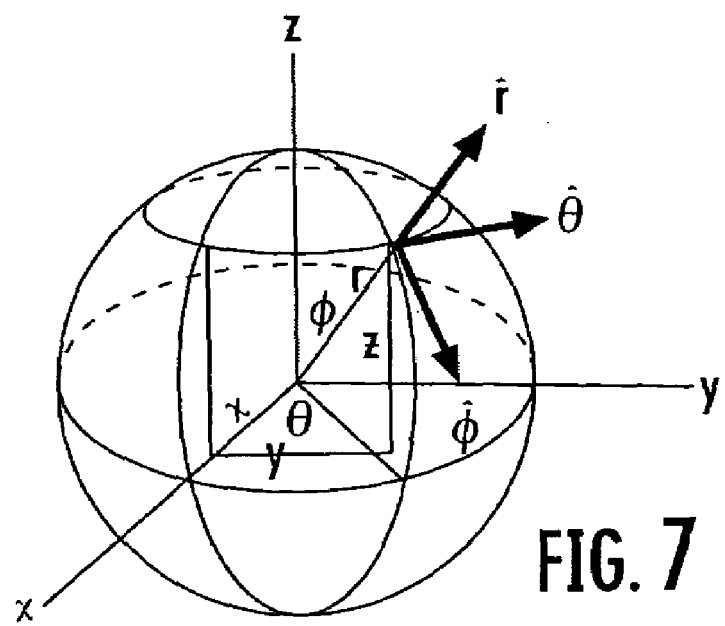
FIG. 7 is a 3-dimensional plot illustrating the use of tri-polarization in accordance with the present invention.

The following discussion supports the use of polarization for populating the mixing matrix A. The three differently polarized antenna elements 182a, 182b, 182c receive three linear and independent signals sums. The definitions and relationships of the x, y and z axis as illustrated in FIG. 7 will be used. For example, the following relationships exist:

$$x = S\cos(\theta)\sin(\phi)$$

$$y = S\sin(\theta)\sin(\phi)$$

$$z = S\cos(\phi)$$

Simplifying assumptions are that the signals have linear polarization, the signals are linearly independent, and there are three linear antenna elements each on an orthogonal axis. For example, antenna element 182a is on the x axis, antenna element 182b is on the y axis, and antenna element 182c is on the z axis.

By positioning the three linear antenna elements 182a, 182b, 182c each on an orthogonal axis, the mathematics is simplified. In an actual deployment, the antenna elements 182a, 182b, 182c need not be strictly orthogonal, nor do they need to meet at a common point. The removal of this assumption will not invalidate the general conclusion, but rather change the cases under which rank deficiency occurs.

The following definitions are applied, wherein numeric subscripts refer to associations with signals 1, 2, 3:

$S_1$, $S_2$, $S_3$: Signals incident to the antenna elements;
$\theta_1$, $\theta_2$, $\theta_3$: The X, Y plane E field angle of the signal;
$\phi_1$, $\phi_2$, $\phi_3$: The Z axis E field angle of the signal; and
$X_x$, $X_y$, $X_z$: Dot product of the sum of signals incident to an antenna element.

Therefore, the vector components are:

|  | x | y | z |
| --- | --- | --- | --- |
| Element 'x': | 1 | 0 | 0 |
| Element 'y': | 0 | 1 | 0 |
| Element 'z': | 0 | 0 | 1 |
| $S_1$ Coefficient: | $\cos(\theta_1)\sin(\phi_1)$ | $\sin(\theta_1)\sin(\phi_1)$ | $\cos(\phi_1)$ |
| $S_2$ Coefficient: | $\cos(\theta_2)\sin(\phi_2)$ | $\sin(\theta_2)\sin(\phi_2)$ | $\cos(\phi_2)$ |
| $S_3$ Coefficient: | $\cos(\theta_3)\sin(\phi_3)$ | $\sin(\theta_3)\sin(\phi_3)$ | $\cos(\phi_3)$ |

Taking the dot product of each antenna element and signal, $(X \cdot Y = x_1 x_2 + y_1 y_2 + z_1 z_2)$ determines the relative E field component summed in the element. These values are used to create the mixing matrix:

$$\begin{bmatrix} X_x \\ X_y \\ X_z \end{bmatrix} = \begin{bmatrix} \cos(\theta_1)\sin(\phi_1) & \cos(\theta_2)\sin(\phi_2) & \cos(\theta_3)\sin(\phi_3) \\ \sin(\theta_1)\sin(\phi_1) & \sin(\theta_2)\sin(\phi_2) & \sin(\theta_3)\sin(\phi_3) \\ \cos(\phi_1) & \cos(\phi_2) & \cos(\phi_3) \end{bmatrix} \begin{bmatrix} S_1 \\ S_2 \\ S_3 \end{bmatrix}$$

where:

$$\begin{aligned}
\det\begin{bmatrix} X_x \\ X_y \\ X_z \end{bmatrix} &= \cos(\theta_1)\sin(\phi_1)\sin(\theta_2)\sin(\phi_2)\cos(\phi_3) + \\
&\quad \cos(\theta_2)\sin(\phi_2)\sin(\theta_3)\sin(\phi_3)\cos(\phi_1) + \\
&\quad \cos(\theta_3)\sin(\phi_3)\sin(\theta_1)\sin(\phi_1)\cos(\phi_2) - \\
&\quad \cos(\phi_1)\sin(\theta_2)\sin(\phi_2)\cos(\theta_3)\sin(\phi_3) - \\
&\quad \cos(\phi_2)\sin(\theta_3)\sin(\phi_3)\cos(\theta_1)\sin(\phi_1) - \\
&\quad \cos(\phi_3)\sin(\theta_1)\sin(\phi_1)\cos(\theta_2)\sin(\phi_2) \\
&= \cos(\theta_1)\sin(\phi_2)\sin(\phi_1)\sin(\phi_2)\cos(\phi_3) + \\
&\quad \cos(\theta_2)\sin(\phi_3)\cos(\phi_1)\sin(\phi_2)\sin(\phi_3) + \\
&\quad \sin(\theta_1)\cos(\theta_3)\sin(\phi_1)\cos(\phi_2)\sin(\phi_3) - \\
&\quad \sin(\theta_2)\cos(\theta_3)\cos(\phi_1)\sin(\phi_2)\sin(\phi_3) - \\
&\quad \cos(\theta_1)\sin(\theta_3)\sin(\phi_1)\cos(\phi_2)\sin(\phi_3) - \\
&\quad \sin(\theta_1)\cos(\theta_2)\sin(\phi_1)\sin(\phi_2)\cos(\phi_3) \\
&= \cos(\theta_1)\sin(\theta_2)\sin(\phi_1)\sin(\phi_2)\cos(\phi_3) - \\
&\quad \sin(\theta_1)\cos(\theta_2)\sin(\phi_1)\sin(\phi_2)\sin(\phi_3) + \\
&\quad \cos(\theta_2)\sin(\theta_3)\cos(\phi_1)\sin(\phi_2)\sin(\phi_3) - \\
&\quad \sin(\theta_2)\cos(\theta_3)\cos(\phi_1)\sin(\phi_2)\sin(\phi_3) + \\
&\quad \sin(\theta_1)\cos(\theta_3)\sin(\phi_1)\cos(\phi_2)\sin(\phi_3) - \\
&\quad \cos(\theta_1)\sin(\theta_3)\sin(\phi_1)\cos(\phi_2)\sin(\phi_3) \\
&= \sin(\phi_1)\sin(\phi_2)\cos(\phi_3)[\cos(\theta_1)\sin(\theta_2) - \sin(\theta_1)\cos(\theta_2)] + \\
&\quad \cos(\phi_1)\sin(\phi_2)\sin(\phi_3)[\cos(\theta_2)\sin(\theta_3) - \sin(\theta_2)\cos(\theta_3)] + \\
&\quad \sin(\phi_1)\cos(\phi_2)\sin(\phi_3)[\sin(\theta_1)\cos(\theta_3) - \cos(\theta_1)\sin(\theta_3)] \\
&= \sin(\phi_1)\sin(\phi_2)\cos(\phi_3)\sin(\theta_2 - \theta_1) + \\
&\quad \cos(\phi_1)\sin(\phi_2)\sin(\phi_3)\sin(\theta_3 - \theta_2) + \\
&\quad \sin(\phi_1)\cos(\phi_2)\sin(\phi_3)\sin(\theta_1 - \theta_3)
\end{aligned}$$

Rank deficiency situations will now be discussed. When the determinant is equal to 0, the mixing matrix is rank deficient. This occurs in the following cases:

1) $\theta_1 = \theta_2 = \theta_3$

The 'x' and 'y' elements are receiving the same contribution from all three signals.

2)

| $\phi_1$ | $\phi_2$ | $\phi_3$ |
|---|---|---|
| 0 | 0 | 0 |
| 0 | 0 | 90° |
| 0 | 90° | 0 |
| 90° | 0 | 0 |
| 90° | 90° | 90° |

Add 180 degrees to any combination of table entries for another rank deficient instance. These are occurrences when the signals are not being independently summed by a sufficient combination of antenna elements.

3) All the individual sums do not equal 0 per 1 or 2, but:

$$\sin(\phi_1)\sin(\phi_2)\cos(\phi_3)\sin(\theta_2-\theta_1)$$

$$+\cos(\phi_1)\sin(\phi_2)\sin(\phi_3)\sin(\theta_3-\theta_2)$$

$$+\sin(\phi_1)\cos(\phi_2)\sin(\phi_3)\sin(\theta_1-\theta_3)=0$$

This implies a small solid angle of separation between the signals, near equal polarization of the signals, signals aligned but coming from opposite sides of the array, or some other very unlikely happenstance of signal incidence resulting in the same energy level to both elements.

As discussed above, the first section of the roadmap addresses antenna configurations. The above described antenna configurations, including uncorrelated sensors, may be combined in a variety of different configurations for providing the summed signals of the M source signals to the mixing matrix.

Figure 8:
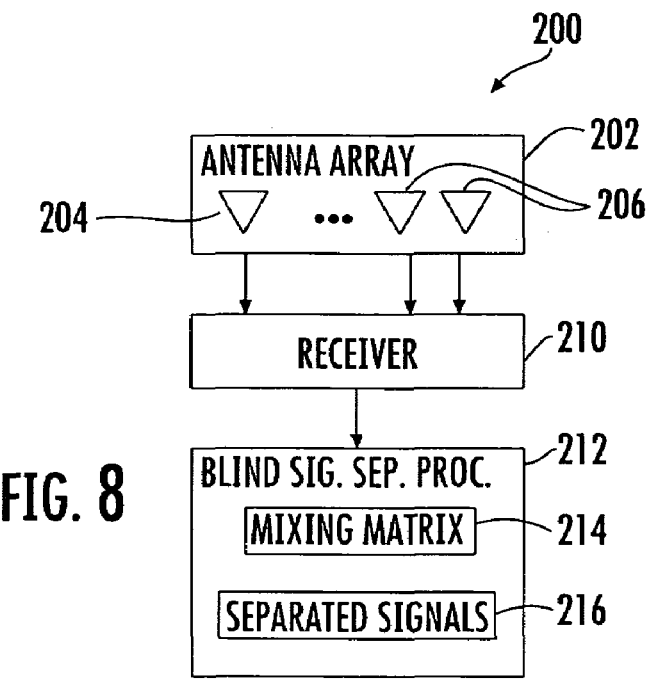
FIG. 8 is a block diagram of a communications device with an antenna array comprising correlated and uncorrelated antenna elements for providing different summations of signals for blind signal separation processing in accordance with the present invention.

Referring now to FIG. 8, a communications device 200 for separating source signals provided by M signal sources will be discussed. The antenna array 202 comprises N antenna elements for receiving at least N different summations of the M source signals, with N and M being greater than 1.

The N antenna elements comprises at least one antenna element 204 for receiving at least one of the N different summations of the M source signals, and at least two correlated antenna elements 206 for receiving at least two of the N different summations of the M source signals. The two correlated antenna elements 206 are uncorrelated with the antenna element 204. The antenna array may include additional antenna elements in various combinations in which the elements are correlated, uncorrelated and polarized.

A receiver 210 is connected to the antenna array 202 for receiving the at least N different summations of the M source signals. A blind signal separation processor 212 is connected to the receiver for forming a mixing matrix 214 comprising the at least N different summations of the M source signals. The mixing matrix has a rank equal up to at least N, and the blind signal separation processor 212 separates desired source signals 216 from the mixing matrix A.

The second section of the roadmap addresses enhancements to the antenna configurations provided in the first section. The enhancements are made so that additional or replacements summations of the source signals are collected to further populate the mixing matrix A.

One enhancement involves array deflection for receiving additional sums of signals for use by the mixing matrix A without having to add additional antenna elements. Array deflection involves controlling antenna patterns in the azimuth and/or elevation direction.

Figure 9:
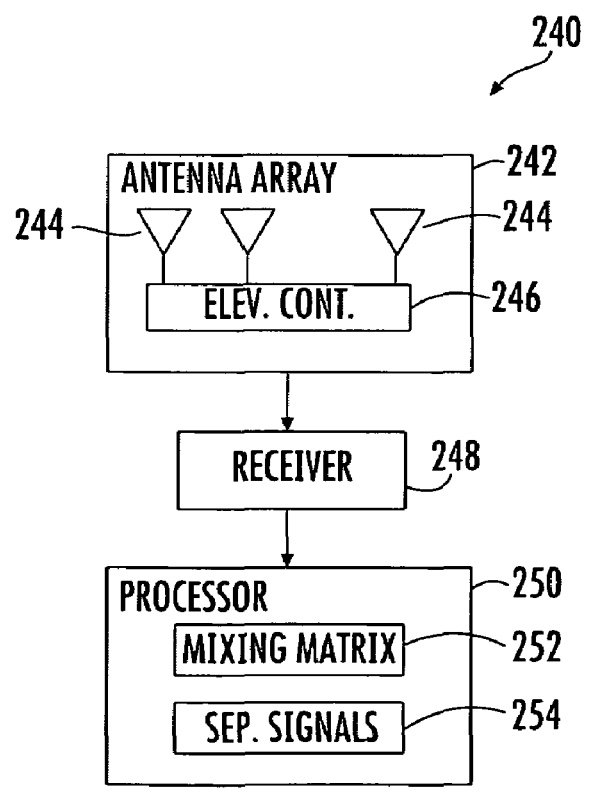
FIG. 9 is a block diagram of a communications device operating based on array deflection for providing different summations of signals for blind signal separation processing in accordance with the present invention.

A communications device 240 for separating source signals provided by M signal sources using array deflection will now be discussed in reference to FIG. 9. The antenna array 242 comprises N antenna elements 244 for generating N initial antenna patterns for receiving N different summations of the M source signals. The antenna array 242 also comprises an elevation controller 246 for selectively changing an elevation of at least one of the N initial antenna patterns for generating at least one additional antenna pattern so that at least one additional different summation of the M source signals is received thereby.

A receiver 248 is connected to the antenna array 242 and receives the N different summations of the M source signals using the N initial antenna patterns, and also receives the at least one additional different summation of the M source signals using the at least one additional antenna pattern.

A blind signal separation processor 250 is connected to the receiver 248 for forming a mixing matrix 252 comprising the N different summations of the M source signals and the at least one additional different summation of the M source signals. The mixing matrix has a rank equal to N plus the number of additional different summations of the M source signals received using the additional antenna patterns. The processor 250 separates desired signals 254 from the mixing matrix.

In general, any antenna array means which provides signal sums suitable for increasing the rank of the mixing matrix can be utilized with a deflection mechanism. The deflection will generate two distinct and mixing matrix usable signal sums for each of the antenna array means. There is therefore a 2 times multiplier effect by utilization of this technique.

If the array deflection is segmented into K distinct areas associated with an antenna, each of the K areas can provide for 2 independent deflection areas and entries into the mixing matrix. For instance, if the antenna array can provide N summations by itself and there are K distinct deflection areas, the number of signal sums in the mixing matrix may be 2*K*N.

Figure 10:
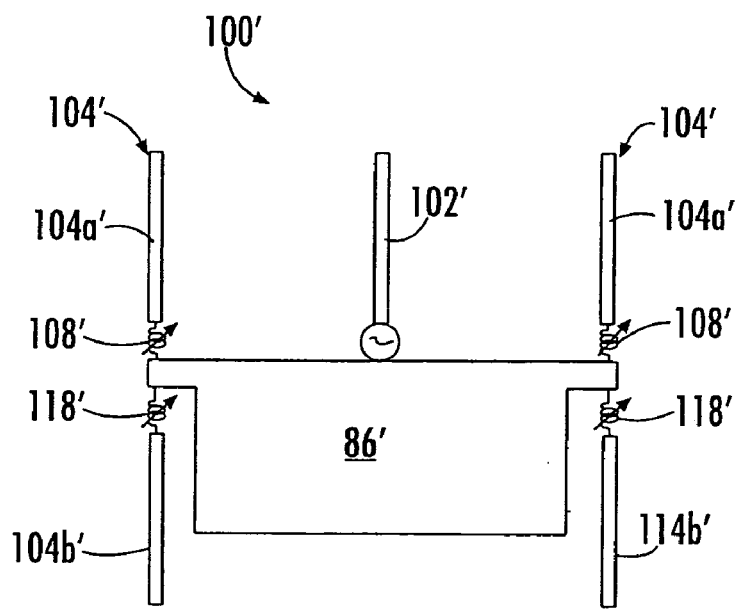
FIG. 10 is block diagram of a switched beam antenna with an elevation controller for selectively changing an elevation of an antenna pattern in accordance with the present invention.

For illustration purposes, reference is directed to FIG. 10 in which the switched beam antenna 100' shown in FIG. 4 has been modified so that the antenna patterns may be tilted up or down in elevation. In particular, each upper half 104a' of the passive antenna elements 104' is connected to the ground plane 106' through a reactive load 108'. Each lower half 104b' of the passive antenna elements 104' is also connected to the ground plane 106' through a reactive load 108'. A reactance on the passive antenna elements 104' has the effect of lengthening or shortening the passive antenna element. Inductive loads lengthen and capacitive loads shorten the electrical length of the passive antenna elements 104'.

Figure 11:
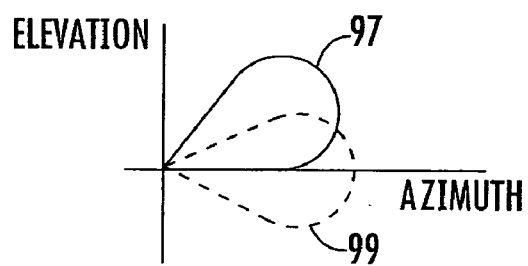
FIG. 11 is an antenna plot illustrating an antenna pattern in the azimuth direction and then rotated in the elevation direction in response to the elevation controller illustrated in FIG. 9.

An antenna beam is tilted up and down in elevation in accordance with the ratios of the reactive loads 108' of the upper halves 104a' and the reactive loads 118' of the lower halves 104b'. By adjusting the ratio, the antenna pattern can point up 97 or down 99, as illustrated in FIG. 11. At least one additional rank is added to the mixing matrix A when an elevation angle of an antenna pattern is adjusted to receive a mixed signal. Using the array deflection, more signals can be received for the mixing matrix A without having to increase the number of antenna elements N.

This particular implementation has 2 distinct deflection areas individually controlled by the reactances 118'. The pattern generation capability of the array is 3 independent patterns, therefore the number of signal sums that can be used to create the mixing matrix is 12 (2*2*3).

Reference is directed to the above reference U.S. patent application Ser. No. 11/065,752, which discloses how to adjust antenna beams in elevation in greater detail. The array deflection technique may be applied to any of the above discussed antenna array embodiments, or any other antenna array which is sensitive to ground plane interactions.

Figure 12:
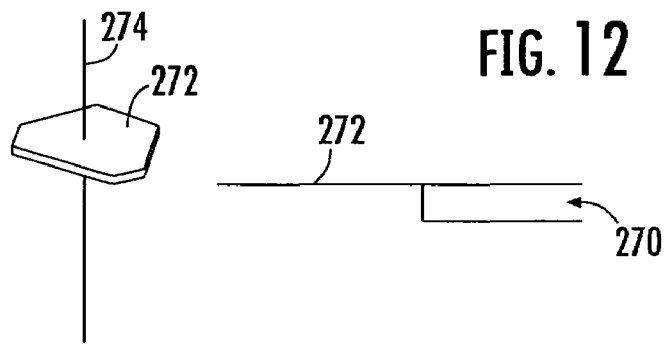
FIG. 12 is a block diagram of an antenna element with an RF choke formed in the ground plane for rotating the antenna pattern in the elevation direction accordance with the present invention.

Another embodiment of the elevation controller is based upon a controllable RF choke 270 coupled to the ground plane 272 of an antenna element 274, as illustrated in FIG. 12. The antenna pattern associated with the antenna element 274 is moved in elevation by controlling the RF choke 270, as readily appreciated by those skilled in the art.

A communications device 300 for separating source signals provided by M signal sources based on path selection will be discussed in reference to FIG. 13. This is another enhancement to the antenna configurations provided in the first sections of the roadmap, as well as an enhancement to the array deflection discussed above. The communications device 300 comprises an antenna array 302 comprising N elements 304 for forming at least N antenna beams for receiving at least N different summations of the M source signals, with N and M being greater than 2.

A controller 306 is connected to the antenna array for selectively forming the at least N antenna beams. A receiver assembly 308 is connected to the antenna array 302 for receiving the at least N different summations of the M source signals. A blind signal separation processor 310 is connected to the receiver assembly 308 for forming a mixing matrix 312 comprising up to the at least N different summations of the M source signals.

The blind signal separation processor 310 also determines if the different summations of the M source signals are correlated or statistically independent, and if not, then cooperating with the controller 306 for forming different beams for receiving new different summations of the M source signals to replace the different summations of the M source signals that are not correlated or statistically independent in the mixing matrix 312. The desired source signals 314 are then separated from the mixing matrix 312.

A rake receiver is a radio receiver designed to counter the effects of multipath fading. It does this by using several independent receivers each delayed slightly in order to tune in to the individual multipath components. It can be used by most types of radio access networks. It has been found to be especially beneficial for spreading code types of modulation. Its ability to select specific incident signal paths make it suitable as a means to change the paths fed to the blind signal separation processing.

Selectively forming the N antenna beams as discussed above may be applied to all radio access networks, as readily understood by those skilled in the art. For CDMA systems, the receiver assembly 308 comprises N rake receivers 316. Each rake receiver 316 comprises k fingers for selecting k different multipath components for each one of the N different summations of the M source signals received by the respective antenna element connected thereto. In this configuration, the blind signal separation processor 310 is connected to the N rake receivers 316 for forming the mixing matrix 312. The mixing matrix 312 comprises up to at least kN different multipath components of the at least N different summations of the M source signals, and the mixing matrix has a rank equal up to kN.

In particular, when CDMA waveforms propagate they often encounter multiple paths from the source to the destination. A rake receiver 316 is specifically designed to capture a number of these individual instances and combine them for a more robust signal decoding. While the original signal propagates along each path, its properties are modified by the unique characteristics of the path. In some circumstances, the modification to the correlation and/or statistical properties of the received signal will be large enough so that they can be treated as separable signal streams. A modified rake receiver 316 could be used to extract each modified stream and feed it as a unique entry into the mixing matrix 312. While this means of increasing the rank will not always be available, it will tend to be available in high multipath environments when it is most likely needed.

Figure 13:
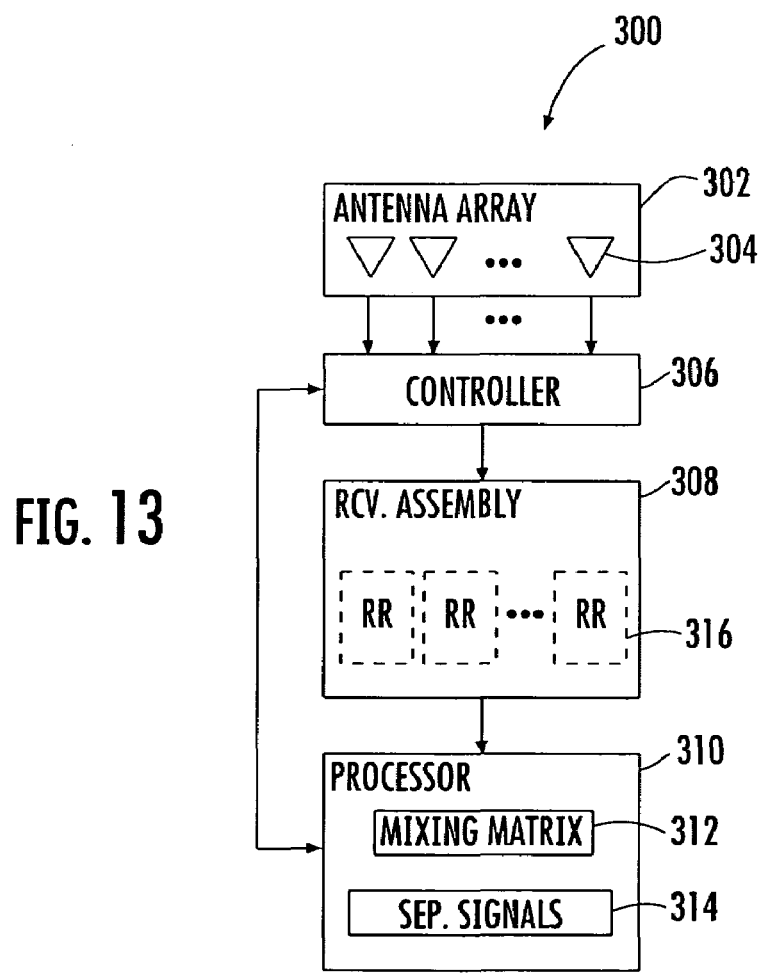
FIG. 13 is a block diagram of a communications device operating based on path selection for providing different summations of signals for blind signal separation processing in accordance with the present invention.

While a rake receiver 316 can exploit the different paths, the more general approach applicable to any modulation technique is beam forming, as discussed in reference to FIG. 13. This differs from the rake receiver 316 since beam forming is used for desired signal enhancement as well as desired signal rejection. The difference however is that the rejected signal may actually be another version of the signal intended for the receiver. However, the receiver assembly 308 needs to detect a number of these unique propagation path versions of the same signal in order to build the mixing matrix 312 to a sufficient rank.

The third section of the roadmap addresses signal splitting for further populating the mixing matrix A. In one approach, the summation signals are split using spreading codes. In another approach, the summation signals are split using in-phase (I) and quadrature(Q) modules.

Figure 14:
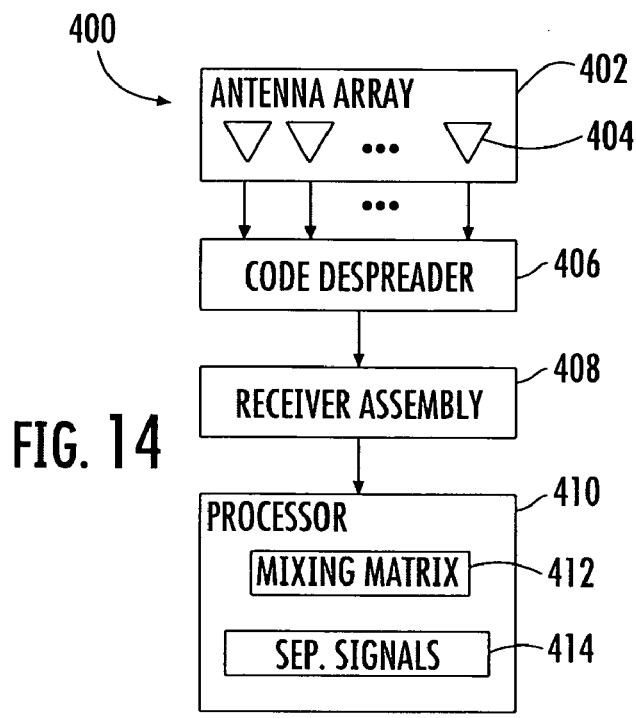
FIG. 14 is a block diagram of a communications device operating based on spreading codes for providing additional summations of signals for blind signal separation processing in accordance with the present invention.

Signal splitting using spreading codes will now be discussed in reference to FIG. 14. The illustrated communications device 400 comprises an antenna array 402 comprising N antenna elements 404 for receiving at least N different summations of the M source signals. A code despreader 406 is connected to the N antenna elements 404 for decoding the at least N different summations of the M source signals. Each one of the N different summations includes k codes for providing k different summations of the M source signals associated therewith.

A receiver assembly 408 is connected to the code despreader 406 for receiving at least kN different summations of the M source signals. A blind signal separation processor 410 is connected to the receiver assembly 408 for forming a mixing matrix 412 comprising the at least kN different summations of the M source signals. The mixing matrix 412 has a rank equal up to kN. The blind signal separation processor 410 separates desired source signals 414 from the mixing matrix 412.

Depending on the modulation of the received signals, the above described signal splitting may be used for increasing the rank of the mixing matrix A without increasing the number N of antenna elements. CDMA IS-95, CDMA2000 and WCDMA are examples of spread spectrum communications systems in which spreading codes are used. A common thread is that a unique code is processed with each signal to spread the data over a larger frequency band.

The same spreading code is processed with the received signal sum (desired signal, undesired signals and unknown noise sources). This causes the desired signal to be reconstructed back to its original frequency bandwidth, while the interferers are spread over the wide frequency band.

The above listed CDMA implementations actually have many signal streams simultaneously using the same frequency band. Each signal stream uses a code that is ideally orthogonal to all the others. If this condition is met at the decoder, it means that only the signal of interest will be despread. If the code of the Kth signal of the sum is used for dispreading, the resultant received signal sum $x_k$ will be mostly made up of an increased amplitude $s_k$ term and either unchanged or lower valued k−1 terms.

There often is some correlation between the CDMA signals, so the interfering signals are somewhat reconstructed along with the desired signal. This is often due to the delay experienced by the individual signals, and also the multipath occurrences of the signals. Some of the undesired signals, especially the CDMA ones, will increase in value. The increase will not be as significant as for the desired signal, but it will still increase the overall noise value, and therefore decrease the signal-to-noise ratio.

The form of the despread signals equation and the signals themselves meet the criteria for blind signal separation processing. In fact, if one of the dispreading codes is individually applied for each known signal received by the communications device 400, individual summations that meet the ICA model requirements are obtained.

Therefore, there are as many row entries available for the mixing matrix as known codes, assuming of course, that they each produce linearly independent significant value. Under the right circumstances this will allow an increase of the mixing matrix to a value greater than the number of codes. For example, N antenna elements and M codes may provide NM matrix rows.

For illustrative purposes, 3 codes are assumed known and the 3 known code signals retain their orthogonality. In the code despreader 406, the mixing matrix A has top 3 rows and bottom 3 rows each due to an antenna stream after each stream has been despread by the 3 known codes. The off diagonal 0 values are due to the orthogonality of the codes. The column entries 4, 5 and 6 are for the general case of unknown signals of the same index.

$$\begin{bmatrix} x_1 \\ x_2 \\ x_3 \\ x_4 \\ x_5 \\ x_6 \end{bmatrix} = \begin{bmatrix} a_{11} & 0 & 0 & a_{14} & a_{15} & a_{16} \\ 0 & a_{22} & 0 & a_{24} & a_{25} & a_{26} \\ 0 & 0 & a_{33} & a_{34} & a_{35} & a_{36} \\ a_{41} & 0 & 0 & a_{44} & a_{45} & a_{46} \\ 0 & a_{52} & 0 & a_{54} & a_{55} & a_{56} \\ 0 & 0 & a_{63} & a_{64} & a_{56} & a_{66} \end{bmatrix} \begin{bmatrix} s_1 \\ s_2 \\ s_3 \\ s_4 \\ s_5 \\ s_6 \end{bmatrix}$$

The signals corresponding to the column entries 4, 5 and 6 can be other path versions of the known codes, or other cell signals of unknown codes. Also, one signal may be Gaussian and the other signal is either CDMA signal groups obeying the central limit theorem so that they appear as a single Gaussian signal, e.g., release 4 channels. In other words, a sufficient amount of non-random signals will add up to a Gaussian signal. The interferers may be Non-Gaussian signal sources or at most one Gaussian signal unknown to the network.

After despreading the known codes in the code despreader 406, the blind signal separation processor 410 receives a mixing matrix 412 of rank 6. The rank of 6 is derived based upon 2 antenna elements multiplied by a factor of 3 since 3 codes are known.

The 6 signals are applied to the blind signal separation processor 410 wherein the mixing matrix 412 having a rank of 6 is formed. The blind signal separation processor 410 determines the separation matrix W from only the received signals modified by the channels: x=As. In the illustrated example, 6 signals are separable.

The blind signal separation processor 410 selects the signals to be decoded. For example, the interferer signals may be dropped and all versions of the desired signals are selected. The selected signals are applied to a demodulator module for demodulation. The demodulator uses well known equalization techniques that combine the multipath versions of the same signal.

In the more general case the off diagonal values shown as 0 above for simplicity, could actually be nonzero. This would be the more usual case when the correlation properties between the coded signals are not perfect. This would represent additional noise to each separated signal. However, as previously shown the rank of the matrix is sufficient to separate these signals, so their value will be significantly reduced after the blind signal separation processing. This leads to a decrease in noise, an increase in signal to noise ratio, and as indicated by Shannon's law an increase in channel capacity.

Figure 15:
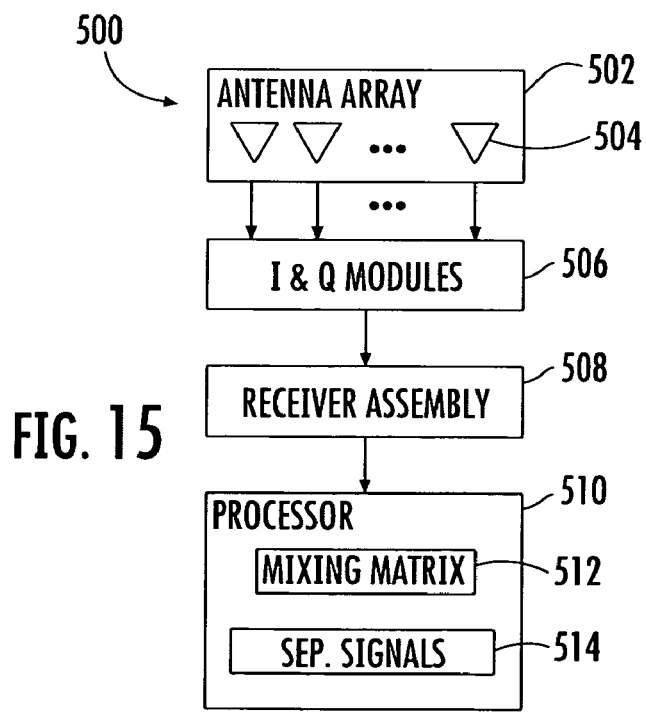
FIG. 15 is a block diagram of a communications device operating based on in-phase and quadrature signal components for providing additional summations of signals for blind signal separation processing in accordance with the present invention.

Referring now to FIG. 15, the other approach for increasing the rank of the mixing matrix A without increasing the number N of antenna elements is to separate a received mixed signal into its in-phase (I) and quadrature (Q) components. I and Q components of a coherent RF signal are components whose amplitudes are the same but whose phases are separated by 90 degrees.

The communications device 500 comprises an antenna array 502 comprising N antenna elements 504 for receiving at least N different summations of the M source signals. A respective in-phase and quadrature module 506 is downstream to each antenna element 504 for separating each one of the N different summations of the M source signals received thereby into an in-phase and quadrature component set.

A receiver assembly 508 is downstream to each in-phase and quadrature module 506 for receiving the at least N in-phase and quadrature component sets for the at least N different summations of the M source signals. A blind signal separation processor 510 is downstream to the receiver assembly 508 for forming a mixing matrix 512 comprising at least 2N different summations of the M source signals. Each in-phase and quadrature component set provides 2 inputs into the mixing matrix 512. The mixing matrix 512 has a rank equal up to 2N, and the blind signal separation processor 510 separates desired source signals 514 from the mixing matrix 512.

Figure 16:
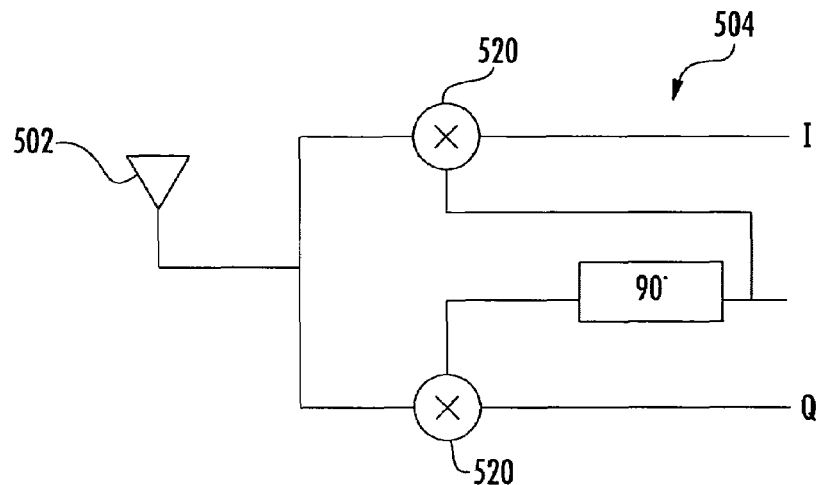
FIG. 16 is a more detailed block diagram of an in-phase and quadrature module connected to an antenna element as shown in FIG. 15.

One of the respective I and Q modules 506 downstream from an antenna element 502 is illustrated in FIG. 16. A mixed signal received at the antenna element 502 is split by a pair of mixers 520. I and Q components are commonly produced by translating an intermediate frequency (IF) signal to another frequency range with two synchronous detectors to which identical reference signals 90 degrees out of phase are applied. Together, the I and Q signals preserve the phase information contained in the IF signal, thereby enabling a signal having a positive frequency to be differentiated from one having a negative frequency.

By separating the received mixed signals into I and Q components, the size of the mixing matrix increases by a factor of 2. As long as the I and Q components are encoded with different data streams, then the mixed signal received at any antenna element may be split into two different mixed signals.

In the case of differential encoding the nature of the modulation needs to be analyzed to determine if I and Q meet the linearity requirement. For instance, it has been shown for GSM that the GMSK encoding can be assumed linear when used with appropriate filtering, and processed in the receiver as if it were BPSK encoding. Since BPSK meets the requirements for blind signal separation processing, the I and Q process described can be used.

I and Q components can be used with any of the above described antenna array embodiments to populate the mixing matrix A. When I and Q is used, the mixing matrix A can be populated as if 2 times the number of antenna elements were used. Another example could be the use of 2 antenna elements (a factor of 2) that are uncorrelated with unequal polarization (a factor of 2*2), and in combination with the I and Q components (a factor of 2*2*2) so that 8 independent mixed signal sums are generated.

This mechanism could also be used with the antenna array deflection technique to create more sums of signals. Each of these sums could in turn also be separated into I and Q components.

Another aspect of the invention is directed to Multiple Input and Multiple Output (MIMO) antenna techniques for exploiting multiple use of the same RF channel. A receiver processing technique for interference cancellation minimizes the number of antennas required by exploiting pattern diversity, rather than using antenna diversity to achieve increased signaling robustness and corresponding data rates.

An antenna array has a changeable weighting in its receiver paths. As these weights are changed, the receive antenna pattern is modified. By using techniques similar to those well documented for blind signal separation (BSS), a desired signal may be extracted from receiver data containing signals from a number of interferers.

Figure 17:
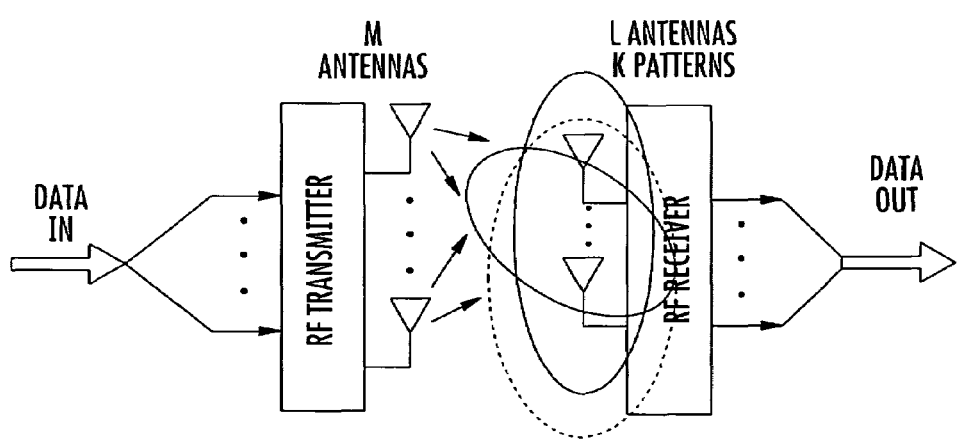
FIG. 17 is a block diagram of a MIMO system operating based on pattern diversity in accordance with the present invention.

Regardless of how the patterns are formed, the substitution of pattern diversity for antenna diversity in the receiving structure of MIMO implementations is possible, as illustrated in FIG. 17. The number of K patterns ideally would be equivalent to the number of N antenna elements. However, the K patterns would be generated with L antenna elements which is lower than the N antenna elements required in the prior art. In a manner similar to the existing antenna array MIMO implementations, M and K are equal only in the case where all transmitted M spatial channels are discernable by the K receiver patterns. Since this will generally be the case only for fixed transmitter and receivers, an excess of receiver patterns or transmitter antennas will be necessary to achieve a minimum of K or M spatial gain. Multiuser detection processing techniques will be utilized to separate out the data channels in the receiver systems. All the methods discussed above for building the mixing matrix may be used as part of this implementation.

Figure 18:
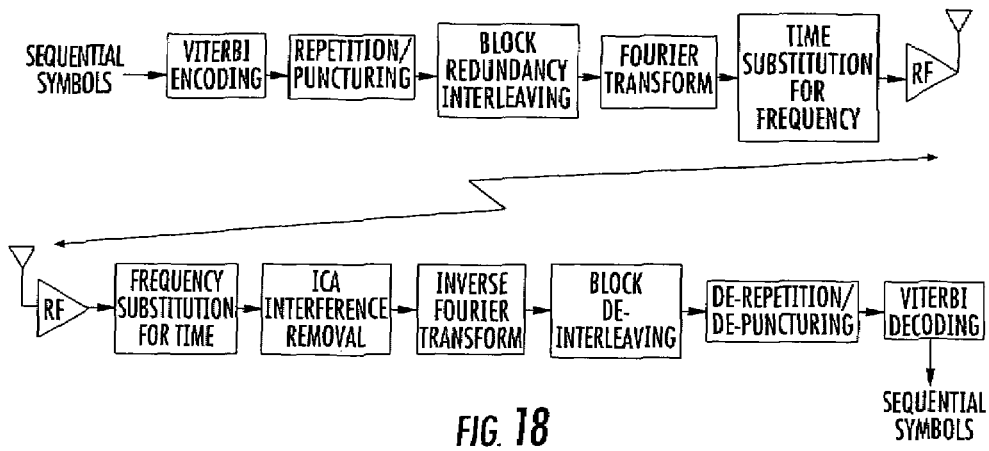
FIG. 18 is a block diagram of a Fourier transform communications system addressing intersymbol interference (ISI) in accordance with the present invention.

Another aspect of the invention is directed to inter-symbol interference (ISI). Limitations when using Fourier transforms for reducing ISI are addressed by the configuration provided in FIG. 18. The following blocks have been added on the transmit side to improve the Fourier transform method of reducing ISI: Viterbi encoding, repetition/puncturing and block redundancy interleaving have been added to the transmit side. On the receive side, the following blocks have been added: BSS interference removal, block de-interleaving, de-repetition/de-puncturing and Viterbi decoding.

The "Viterbi Encoding" has a robust redundancy that overcomes inaccuracies in the data decoding process. Alternate forms of coding such as turbo coding are also applicable. The "Repetition or Puncturing" enables data block matching between the source data rate and the transmitted data rate. The "Block Interleaving" randomizes the sequentially arriving source data to maximize the probability of proper decoding, in that it improves resilience to propagation channel conditions. This introduces block errors due to, for example, a severe fade, by distributing the block errors prior to the Viterbi decoder which can recover the data stream from randomly distributed errors much more effectively than block errors. The "BSS Interference Removal" reduces the signal to the intended signal prior to conversion back into the time domain.

Given that the resulting frequency domain signal has a known statistically characteristic, which is unlikely to be uniform, the best way to cope with the non-uniform distribution (level of the PAR) would be to add in a non-linear mapper (to equalize the signal level across the frequencies) at the output of the FFT, and a reverse transform at the input to the IFFT.

In addition, this signal would typically be modulated and banded into a transmit frequency in a realistic scenario so adding in a modulator, up converter and down converter, demodulator would complete the picture. There will be a discontinuity at the boundaries between the transmitted waveforms. This can be mitigated in several ways. One would be to add a guard band between the waveforms in which a curve is interpolated between the waveforms to minimize the frequency components generated. All the methods discussed above for building the mixing matrix may be used as part of this implementation.

Figure 19:
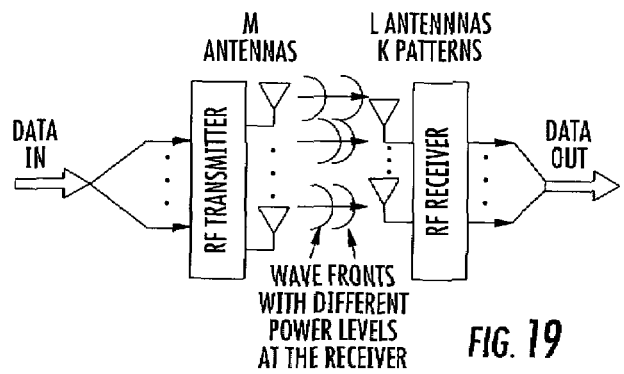
FIG. 19 is a block diagram of a communications system in which a transmitter changes power levels for each layered space stream on a time slotted basis in accordance with the present invention.

Another aspect of the invention is directed to pattern diversity to support layer space communications. Referring now to FIG. 19, in the preferred embodiment the transmitter changes the power levels for each layered space stream on a time slotted basis. The streams therefore arrive at the receiver with various power levels, which provide suitable differences in the received signals for population of a matrix suitable for BSS separation processing. Since all the power adjustments are done at the transmitter, the number of L antenna elements at the receiver is one, and no pattern generation hardware or software components are needed at the receiver.

This approach also addresses the prior art in that small angular differences between arriving signals is no longer a problem in creating pattern contours that adequately differ between the signals.

In another embodiment, there are significant interferers other than from the desired transmitter. If there is a single such interferer, the differences between it and the changing desired transmitter wave fronts will be adequate to have the BSS processing separate all the signals. If there is more than one significant interferer the rank of the matrix may not be adequate. The system performance could be improved by creating additional pattern changes at the receiver. While this is a deviation from the preferred embodiment, it still requires significantly fewer patterns than before, and therefore, a less involved implementation at the receiver.

In another embodiment, multiple streams of data are summed together for transmission via one power amplifier via a single antenna element. On a time slotted basis the relative power level among the summed signals is varied in a fashion suitable for BSS decoding at the receiver. An advantage of this approach is that the individual signal streams in the composite signal experience the identical propagation path effects, which means the relative signal relationships are maintained between the transmitter and the receiver. This provides a very robust decoding situation at the receiver.

This concept is scalable in that a number of individual sums of signals can be sent via different antenna elements. Robust signal separation can therefore be obtained along with multipath diversity gains and/or spatial capacity gains. To address the issue of peak to average signal power ratios ideally being constant, the powers of the summed signals could be adjusted in a fashion that maintains a near constant power level. All the methods discussed above for building the mixing matrix may be used as part of this implementation.

Figure 20:
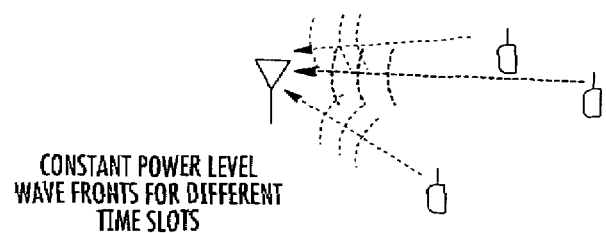
FIG. 20 is a block diagram of a communications system in which undulating patterns are used to support multiple transmitters transmitting to the same access point in accordance with the present invention.

Another aspect of the invention is directed to undulating patterns to support multiple simultaneous transmitters. Referring now to FIG. 20, multiple devices transmitting to the access point modulate their RF patterns. The intended access point and unintended access points will therefore receive different power level versions of the transmitted signals. This provides the information necessary for BSS to separate the signals.

The modulation can be as simple as changing the transmitted power. This can be done independent of the pattern's contour, so omni-directional, sectored, or even beam formed patterns can be used. Other techniques such as changing the bore sight of a transmission beam can also be used.

The most effective approach is to have the transmitters use aligned time slots. The timing can be set by using internal clocks in the devices, or syncing up to a common time mark sent by the access point. If there is misalignment as to when the signals arrived at the receiver, there is a degradation in the BSS ability to separate the signals. Alignment can be adjusted by determining the distances to the devices, or measuring the time delay. Timing advance or retardation techniques can then be used by the accessing devices.

Given that the signal received gain changes are both being used by BSS equipped access points which consider them targets and in other cases interferers, the proper receiver to align with may vary. If there is no overall network coordination, the intended receiver should be aligned to. If there is overall network coordination, measurements may show that the best approach is to make the signal easier to remove as an interferer, while still providing adequate alignment for separation at the intended receiver.

If there are other signal sources which do not use the RF power level modulation technique, classical signal rejection techniques can be used. Alternately, the receiver may use patterns or other means to increase the rank of the BSS suitable matrix. Even if the latter means are utilized, the degree of the matrix information derived will greatly reduce the overhead to implemented at the access point receiver. All the methods discussed above for building the mixing matrix may be used as part of this implementation.

Another aspect of the invention is directed to adjusting BSS RF decoding for optimized processing and power drain. The number of signals that need to be separated to decode the stream(s) of interest are reduced. In general the rank of the decoding matrix determines the number of the most significant signals that will be separated, while the rest of the signals are treated as noise. This value therefore needs to be at a minimum inclusive of the signals to be decoded. A possibly higher minimum may be necessary to decrease the noise component so that the signal to noise ratio allows an acceptable decoding error rate.

Figure 21:
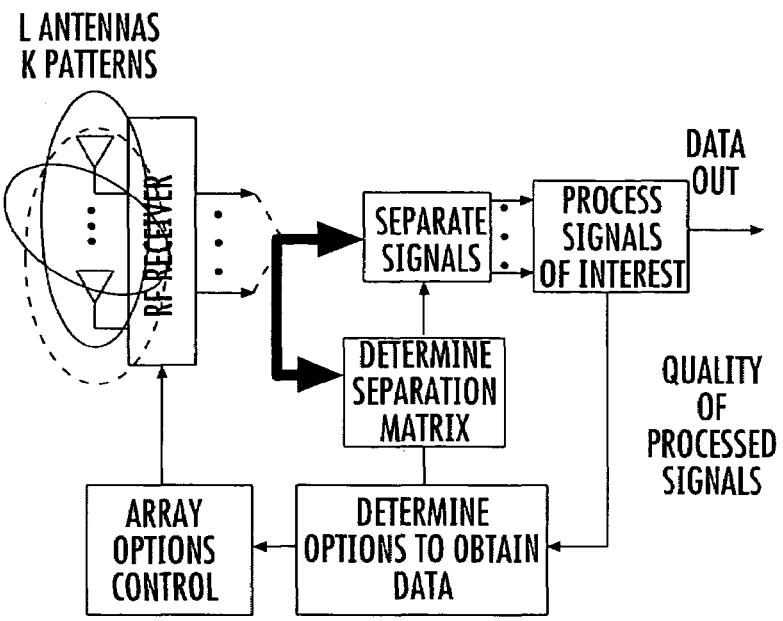
FIG. 21 is a block diagram of a receiver optimizing processing and power drain in accordance with the present invention.
Figure 22:
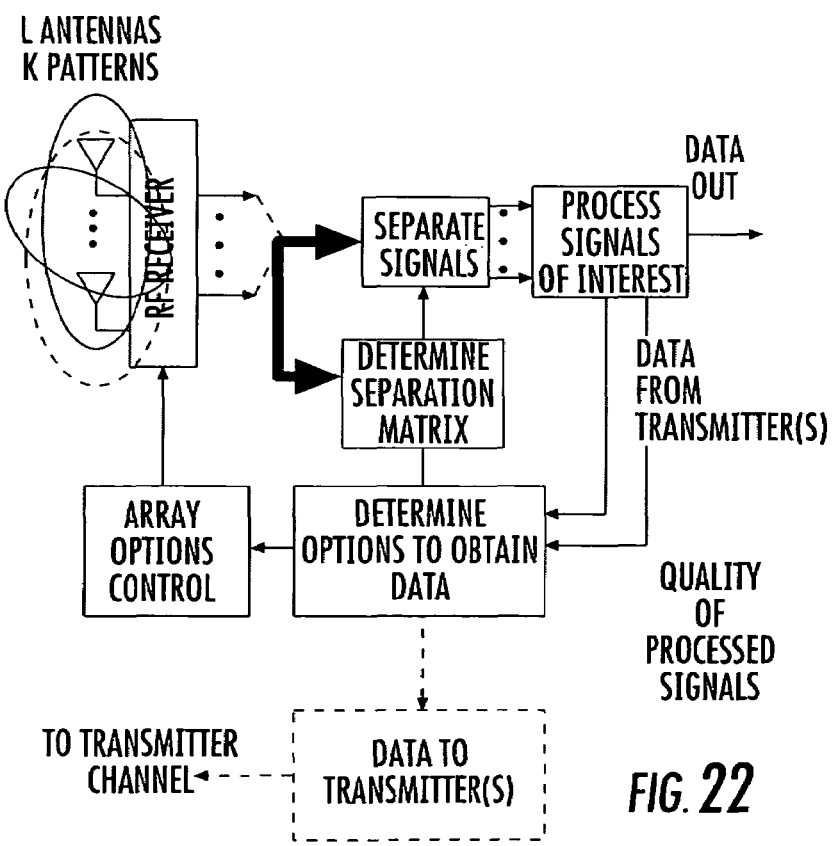
FIG. 22 is a block diagram of the receiver illustrated in FIG. 21 coordinating its operation with a transmitter.

FIG. 21 illustrates implementation of the receiver only operation. FIG. 22 is a superset of FIG. 21 and also includes data from the transmitter(s) to the receiver, and optionally, data from the receiver to the transmitter(s).

If the options to fill the matrix exceed the rank necessary for operation, the antenna array control can reduce the number of options being utilized. Some selections from the available set may be more desirable than others, and the optimum selection can allow for a lower matrix rank. This set can be determined by examination of the signals from the various options in comparison with the other options, by trial and error techniques (e.g., comparisons of results with option k used and not used), or by historical tracking of conditions and results. Which method or combination of methods used can also be determined based on effectiveness given known conditions and historical evidence.

When a device is known to be within range of significant signals from several sources, as occurs in coverage overlap regions, the highest power signals can be expected to come from significantly different directions. The options should therefore be chosen to provide significant signal differences in those directions.

With respect to encoding, the error correcting encoding determines the error rates that can be tolerated in the raw decoded streams. Since the raw error rate is also a function of the subset of the matrix fill options, there is a tradeoff between these settings. A feedback and control loop between the encoder and decoder can be used to choose the optimum mutual settings.

If the receiver is found not to be in a power limited situation (e.g., power by line voltage), the decoder may increase its matrix rank. This can be used for several purposes. A higher rank may reduce the noise, which increases the signal to noise ratio, which in turn reduces the error rate. Reduced noise may be used to increase the transmit data rate, reduce the error correction encoding, or improve the overall reliability of the link.

Shifting the burden of matrix filling to the receiver can also reduce the load on the transmitters, which can be exploited if there is a control loop between the two. Conversely, a device using a battery may try to negotiate an increase in rank creation to the more robustly supplied device(s).

By changing timing settings, the most robust operation requires that the decoding matrix be recalculated for every symbol. Often however, the coherence time exceeds the number of symbols, such that measurements are only needed at a rate slightly faster than the coherence time. Reducing the decoding matrix determination occurrences will save power and processor overhead.

Monitoring the changes in the matrix from one occurrence to another is used to determine how often the decoding matrix must be recalculated. In wide band systems the subchannels often have individual coherence times. Each subchannel can have its own decoding matrix and associated measurement rate. This eliminates the need to recalculate one very large decoding matrix at the fastest necessary rate. In general, the sum of measurements for the sub-decoding matrixes will be less than for the use of one large one.

With respect to pattern transmission, if the source is creating patterns, the receiver can adjust its matrix fill receive options to provide adequate matrix rank. The receiver can base its value on information as to the transmission characteristics it is informed of by the transmitter(s), measurements on the received streams and decoded data, or negotiated settings with the source(s). In the negotiated case the resource constraints of the source may also be taken into account, so that it is possible that either one could assume a higher burden in order to offload the other the one.

With respect to matrix solving techniques, in general the decoding matrix will not vary much from one calculation to the next. The prior values can therefore be used as seeds to iterative determination of the solution, which will be less processor intense than determination from scratch. When the matrix is large to be begin with, iterative decoding will usually be faster even when the solution is determined from an unknown state. This is a well know way to solve large ranked, fairly full matrices.

In general, combinations of all of the above are possible depending on available components, revision code levels, suitable equipment, and other factors which affect plausible operation. All the methods discussed above for building the mixing matrix may be used as part of this implementation.

Another aspect of the invention is directed to undulating patterns to support effective area coverage. With respect to pattern transmission, the basic concept is to use sectored coverage patterns at the infrastructure sites. The actual number of sectors utilized varies with capacity needs and related cost factors. Real implementations may vary from a single sector, to an arbitrarily large number. The sectors themselves may be subdivided in the azimuth or elevation or azimuth and elevation planes. A key benefit of using sectoring is that it alleviates the need for tracking the device at the other end of the link as per the beam forming method. Leaving the coverage region of one sector for another is therefore reduced to a classical handoff situation.

The prior art has the receiver generating the pattern changes suitable for BSS signal separation processing. In contrast, the transmitter utilizes techniques so that a suitable BSS decoder environment at least partially exists. In some implementations this will mean the receiver need not generate any undulating patterns. In other implementations, it means the number of undulating patterns is significantly reduced.

Figure 23:
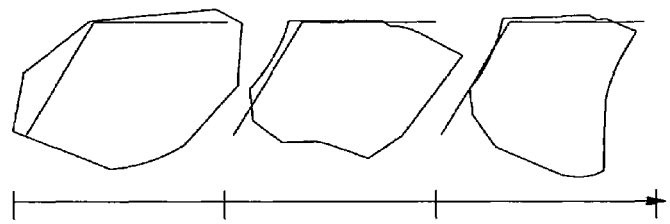
FIG. 23 is a plot of transmit pattern contours being undulated in a timing sequence known to a receiver in accordance with the present invention.

One embodiment is for one transmission point. This embodiment addresses the situation when it is unknown whether other transmission sources in the region are also operating. Referring to FIG. 23, the transmit pattern contours are undulated in a timing sequencing know to the receiver.

The changes in the transmit pattern are timed to coincide with divisions of the transmit symbol. Instead of bore sight movement, the contour of the pattern is changed and held constant for each time slot. The coverage area therefore does not significantly change, and there is no foresight tracking issue to contend with.

The receiver will experience a change in wave front power level due to the changing transmission contours. The BSS matrix will therefore be populated with the differences of the various signal streams at different relative gain values.

If the received dominant signals are all from one or more transmitters using the undulating signaling, the receiver merely takes samples during each pattern change, and uses the resulting data to populate the matrix for BSS signal separation.

If there is a mix of transmitters using the undulating signaling and others are not using it, the receiver can use classical signal separation techniques to account for them. Methods such as beam forming and multi-user detection may be used, for instance. However, the BSS method will usually be more robust. When practical, the receiver can implement pattern deformation and generate enough additional patterns to increase the rank of the BSS matrix above the number of signals to be separated.

For the BSS decoder implementation for example, if three contours with three signals are sent by the transmitter and there are two other signals being received, the receiver would need to generate at least two contours to separate the interferers against each other. This is three contours less than would have been needed if the transmitter were not generating its own set, so the implementation burden on the receiver is always reduced.

If a transmitter is sending a single stream along a signal path, the pattern contour set need not be rotational or dissimilar. This is because the signal as detected at the receiver is being changed relative all other received signals. The transmitter may therefore use a simple power change for the overall pattern rather than needing to change the shape of the contour. If only one other stream is summed at the receiver, BSS will be able to separate them even though one is constant in amplitude. This is because the power dithering source provides the changes necessary for its operation. If more than one other stream is received, they appear as a single grouped interferer to BSS, unless the receiver itself uses other separation means, or has its own undulating pattern generation capability.

A pattern transmitter in the receive mode will now be discussed. Since BSS processing of multiple pattern contours is an excellent method for signal separation, the same techniques used to generate the transmit patterns can also be used to generate multiple receiver values. The only cost factor for BSS reception when transmission is already supported, is therefore the BSS processing overhead.

User equipment receiver feedback to the transmitter will now be discussed. While not strictly necessary, feed back information from the user equipment receiver can be used to improve the overall operation of the links. For instance, the receiver can determine the degree to which each change in pattern contour provides useful data. This information is fed back to the transmitter. The transmitter can then adjust its operation to improve the link, utilize less power, or cause less interference to other communication links. Some of the adjustments could be: which and in what sequence each pattern is used, and how many changes are made during the course of a symbol transmission (i.e., change from M to N contours). Adjustments in contour changes per symbol will need to be conveyed to the receiver for best performance.

A second embodiment involves multiple transmission points that are known to be using the above described approach. The receiver operation for the multi-transmitter site implementation is basically the same as for the single site. The difference is that the patterns generated by each transmitter can be counted at the receiver for BSS signal separation.

More robust operation however may be obtained by receiving information from the network as to the nature of the coordinated transmission parameters. For instance, the rank of the matrix, which in turn dictates the number of required patterns, can be adjusted. The receiver's generation of patterns, when available, is therefore adjusted per this information. Network wide radio resource management can utilize information fed back the user equipment to establish network wide pattern usage, orientations, power levels and timing. All the methods discussed above for building the mixing matrix may be used as part of this implementation.

Another aspect of the invention is directed to BSS and pattern undulation to aid CDMA signal separation. For an BSS algorithm to effectively separate the signals, the $x_j$ receive signal must be an aggregate of the signals received at the antenna with relatively different weighting factors associated with each individual signal. This can be done at the transmitter, the receiver, or both positions. Whether the weighting factors are changed at the transmission end or the reception end, they can be changed per chip or set of contiguous chips. The basic requirement is that the aggregate signal be adjusted per symbol at least as many times as there are signals to separate.

Figure 24:
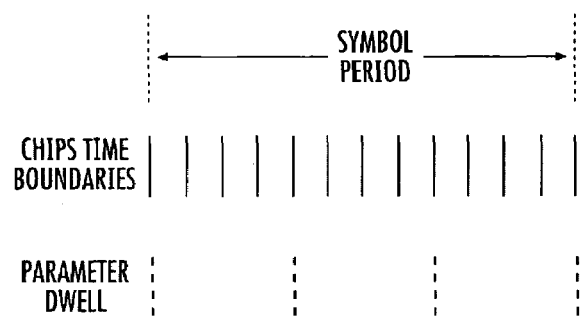
FIG. 24 is a time line in which a symbol period has 12 variations (i.e., 12 chips) while the parameter being varied is held constant for 4 chips in accordance with the present invention.

FIG. 24 shows a case where in frequency the symbol is varied 12 times (12 chips). The parameter being varied is held constant for 4 chips. Three variations per symbol implies that three distinct signals can be separated from the aggregate received signal.

If a transmitter is sending a single stream along a signal path, the pattern contour set need not be rotational or dissimilar. This is because the signal as detected at the receiver is being changed relative all other received signals. The transmitter may therefore use a simple power change for the overall pattern rather than needing to change the shape of the contour. If only one other stream is summed at the receiver, BSS will be able to separate them even though one is constant in amplitude. This is because the power dithering source provides the changes necessary for its operation. If more than one other stream is received, they appear as a single grouped interferer to BSS, unless the receiver itself uses other separation means, or has its own undulating pattern generation capability.

While not strictly necessary, feed back information from the user equipment receiver can be used to improve the overall operation of the links. For instance, the receiver can determine the degree to which each change in pattern contour provides useful data. This information is fed back to the transmitter. The transmitter can then adjust its operation to improve the link, utilize less power, or cause less interference to other communication links. While there are many ways of changing the power profiles, some of the adjustments could be which and in what sequence each pattern is used; how many changes are made during the course of a symbol transmission; and how to modulate or dither the power to an individual link. Adjustments in contour changes per symbol will need to be conveyed to the receiver for best performance.

Practical power amplifiers are best utilized in their linear operational range. With a large peak to average power ratio, the operational range for linear operation is reduced resulting in a reduced linear dynamic control range for the PA, and hence a reduced operational distance between transmitter and receiver. When power is the transmit parameter being utilized, this concern can be mitigated by several approaches.

These approaches include when more than one sink is being powered by the same amplifier, the BSS changes can be synchronized in a fashion such that the sum of the powers of all signals remains constant. In other words the increase of some transmissions is offset by the decrease of others. If the power is modulated at a value close to the chip rate, the excess power can often be absorbed by the decoupling storage elements with minor ripple induced. Excess power can diverted to a dissipation load.

The patterns in two or three dimensions may be created by a number of means for both the transmit and the receive antennas, including adjustment of the delay and power level of phase array antennas; parasitic antenna elements with switchable loads; changes in polarization; changes in power plane loading which cause deflection of the patterns; mechanical movement of elements or reflectors; and a combination of any of the above. All the methods discussed above for building the mixing matrix may be used as part of this implementation.

Another aspect of the invention is directed to a single receiver for multiple spatial independent channels. Switched parasitic antennas can be coupled with a high speed digitizer and down converter to provide multiple spatial independent channels to a base band processing structure. Multiple spatial independent channels are provided by using a single low noise amplifier (LNA), a mixer, a local oscillator (LO), a low pass filter (LPF) and an analog-to-digital converter (ADC).

The multiple spatial independent channels obtained with this technique may be processed any of a variety of ways. Examples might include coherent combining, blind signal separation (BSS) or multiple input multiple output (MIMO) receive processing.

Figure 25:
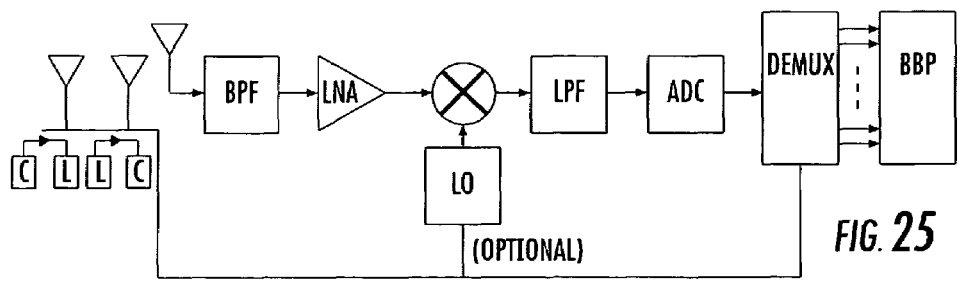
FIG. 25 is a block diagram of a receiver for multiple spatial independent channels in accordance with the present invention.

The system principles are described below and relate to FIG. 25. The preferred embodiment consists of a single antenna array with switching components into inductors and capacitors. The band pass filter limits both the frequency band and total RF power presented to the LNA. The LNA is not just a low noise amplifier for the received signal. The mixer and LO tune the RF signal down to either an intermediate frequency (IF) or to base band DC. Either implementation is compatible with the back end processing.

The antenna switching, optional LO switching and demultiplexor switching are all driven by the same digital sequence generator so that the N channels of signal are produced from the N diversity modes of the antenna. This produces a single channel RF output from the mixer to present to the LPF and ADC.

The ADC, while not shown in the figure as such, is synchronous to the same digital sequence generator that drives the antenna modes, optional LO and demultiplexor. Considering a signal with carrier frequency Fc and modulation bandwidth B, the demiltiplexor acts as a down-sampling operation with impulses for the pulse shape. For an array with N elements, the sampling frequency of the ADC must be at least 2*N*B. The N is needed since only one of every N samples will be presented to a demodulator chain in the base band processor. The 2*B is needed to satisfy the Nyquist sampling theory. Therefore, the signal bandwidth received by this system is also limited by the switching speed of the device.

The demultiplexor alternates samples to each of the N parallel demodulator circuits inside the BBP. The sample distribution scheme must not be in groups but instead, sequential distribution. For example, if there are three antenna diversity options (left, right and omni) then N=3. The samples from the ADC numbered 1, 2, 3, 4, 5, 6, 7, 8, 9, 10, 11, 12 would be distributed as such 1, 4, 7, 10 to the first demodulator chain; 2, 5, 8, 11 to the second demodulator chain; and 3, 6, 9, 12 to the third demodulator chain.

As mentioned before, the demodulators could be a form of coherent combining, BSS or either of the two common MIMO demodulation techniques. This could be N instantiations of a single demodulation circuit or one package that expects N spatially independent channels. The coherent combining could be the weighting of soft decisions or manipulations of hard decisions. Some implementation limitations are discussed below. They include signal to noise ratio (SNR) considerations, noise figure, impedance matching, and received signal power.

If you assume that the antenna array has a bandwidth that is matched to the received signal, the in-band SNR has remained the same. However, the in-band signal energy has been reduced by a factor of $N^2$ compared to that of a conventional array.

Since the LNA is the first effective component in the signal path after the antenna array, the noise figure is not as much a concern as when switched arrays start with a PIN diode. Since each channel after the demultiplexor receives 1/N of the signal power, the LNA gain requirement is increased by $10 \log_{10} N$ to retain comparable signal amplitudes at the output of the mixer.

Switching among different antenna elements will introduce a change in impedance matching characteristics. This is not the case for the antenna implementation which always has the "active" antenna element as the only one directly connected to the RF path. The other "parasitic" antenna elements are only influential on the RF path.

An alternate embodiment that could be compatible with some MIMO and other parallel path transmission schemes is to integrate tuning the LO to different carrier frequencies as well as switching to different diversity modes of the antenna array. This could be done synchronous or independent of each other. In time they must still occur simultaneous, but the state of each (array mode versus carrier frequency) does not need to stay in phase.

This would be a useful implementation to receive the 802.11g+ waveforms where two regular 802.11g waveforms are transmitted on different carriers in parallel. In this case, you would alternate between the upper and lower carrier frequency on the LO and then in a different pattern, alternate the different diversity modes of the antenna array.

The mixer can be set to down-convert the RF waveform to an IF or to baseband DC. This changes some of the sampling requirements of the ADC. Intentional aliasing and other techniques can perform IF under sampling and still recover the information content intended.

This approach also considers the dual use of the antenna for both receive and transmit functions. For some applications such as satellite reception, the transmit function is not required. For time division duplexed systems (such as WLAN, WiMAX, WCDMA-TDD, TD-SCDMA, etc.) or time slotted FDD systems (such as GSM/GPRS) where receive and transmit are not simultaneous, the receive antenna can be multiplexed when the transmit mode can be considered independent. For full duplex FDD systems (such as CDMA2000 or WCDMA-FDD) the transmit function may be accomplished by way of a separate antenna(s). Any of these air interfaces may use any of the enabled demodulator techniques (coherent combining, BSS, MIMO).

Another aspect of the invention is directed to BSS as applied to CDMA receiver processing. Antenna arrays with adequate separation between antenna elements are suitable for feeding the decoding chains. A survey of the available literature indicates that in general this is the belief of those skilled in the art.

Other documents discuss what is referred to as Single Antenna Interference Cancellation (SAIC) techniques. Those that utilize BSS, require that the modulation have correlated and or statistically independent I and Q channels to create a rank 2 matrix. These decoders therefore separate one interferer and the desired signal. If there are two interferers, existing SAIC techniques are not viable. They refer to this as using a "virtual" second antenna.

The prior art can be improved upon by obtaining independent sums of the signals by the existing art means, and by other methods not presently exploited in the literature. While I and Q means are practical in some radio access networks, they may not be suitable for CDMA encoding. All the methods discussed above for building the mixing matrix may be used as part of this implementation.

While these techniques increase the rank of the ICA usable matrix and make it more likely the application of the ICA will also extract the desired signals, it cannot be guaranteed. So the techniques just detailed still need to be used to select the appropriate decoding chain. For instance, you would need to back off from ICA processing if it was overly detrimental to the signal sum being processed.

Figure 26:
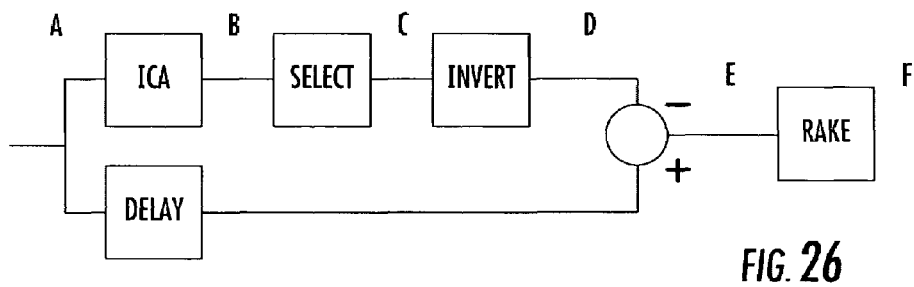
FIG. 26 is a block diagram of a receiver decoding chain in accordance with the present invention.
Figure 27:
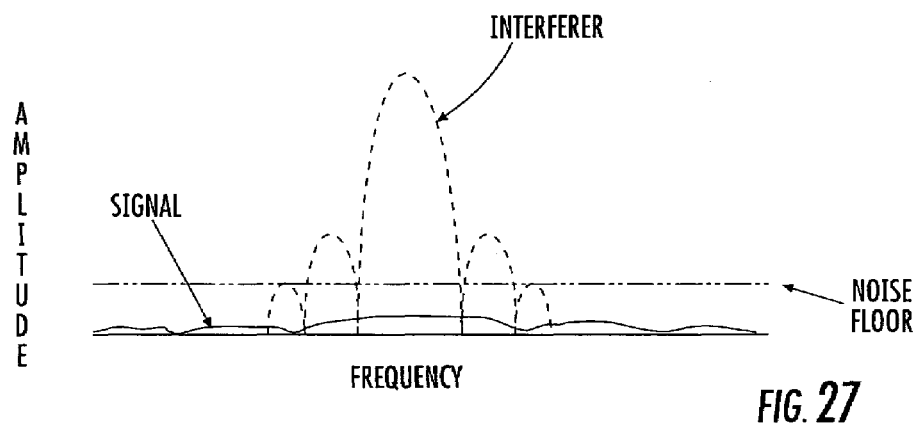
FIGS. 27–30 are amplitude versus frequency plots respectively corresponding to nodes A, B, D and E in FIG. 26.

In a second embodiment, a different decoding chain is utilized as illustrated in FIG. 26. At Node A an example of a signal set is shown in FIG. 27. A single interferer is shown for clarity, but the same arguments can be applied to multiple interferers and an increased matrix rank. The noise floor is exceeded by a narrow band interferer, and the desired CDMA signal is below the noise floor.

Figure 28:
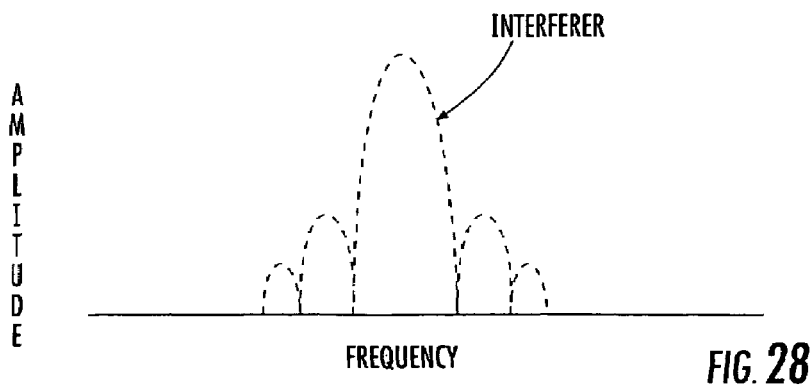

At node B in FIG. 28, the interferer has been extracted. The "selector" determines if the extracted signals are indeed interferers. If no interferers are present, no signal is selected. If a signal has the characteristics of the desired signal, it is not selected. If one or more interferers are selected, they are presented to the "inverter" (Node C). ICA extraction can invert or not invert a received signal, and a determination is necessary as to whether each signal needs to be inverted to match the received signal.

The interferers, with the correct amplitude sign, are presented to the negative input of the summer at Node D. One skilled in the art would of course recognize that alternative, but equivalent implementations are possible. For instance a pure summer could be utilized at this stage, and the inverter would only be employed when the signals were extracted with the non-inverted waveform. A delayed version of the original received signal (Node A) is presented at the other summer input. The delay value is equal to the delays incurred by the ICS, Select, and "inverter" processing. One skilled in the art would of course recognize that alternative, but equivalent implementations are possible. For instance, the delay and summer functional blocks could be replaced by a minimization block that shifts and sums the two signals until a minimum is realized.

Figure 29:
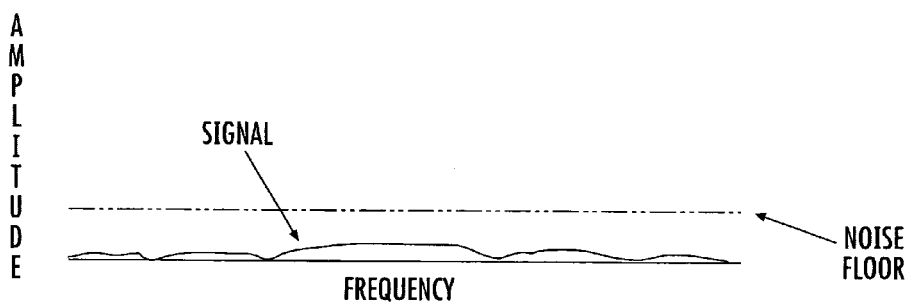
Figure 30:
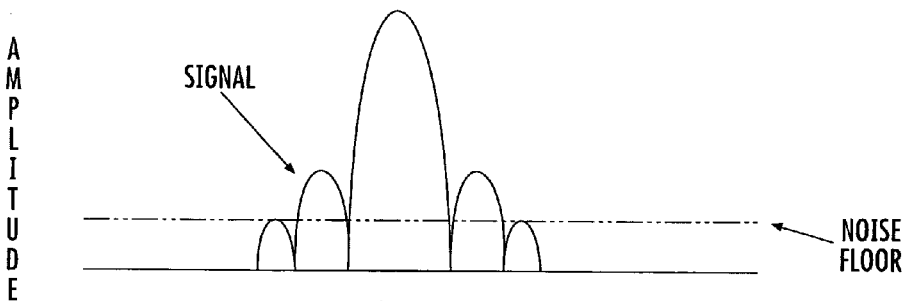

At Node D in FIG. 29, the interferers have been removed. At Node E in FIG. 30, the Rake receiver has de-spread the signal, which now may be presented to the base band decoder. A further detail of this embodiment is that the signals gathered by the antenna structure can be obtained via the options per the previously discussed embodiment for enhancing the existing art.

It should be recognized the structure as shown in FIG. 26 is only one way to implement the outlined invention. Rather than having the "selector" present no signal when appropriate, the prior art implementation of selecting a different path other the other either in pre or post processing position could also be used. The tradeoffs have to do with processing delays, cost of implementation, robustness of overall operation, and to some degree designer's choice. Only the underlying fundamental concept of subtracting the interferers from the signal stream before presentation to the rake receiver needs to be retained in all variations to be of the same invention.

While the prior explanation is shown for a perfect removal of interferers, it should be realized that not all interferers may be removed. The removal of any interferers however will in general provide for improved performance over the prior art, given that the Rake decoder will be dealing with an improved signal set.

The CDMA signal by its nature is more Gaussian than its despread version, and will tend to be more difficult for ICA to detect. The removal of some data associated with the desired signal however is also possible, since the signal still retains some statistical significance. Once again the removal of the interferers will usually be much more significant, and an overall gain in what is presented to the Rake decoder. Alternately, the overall decoding process could be further enhanced by using an incremental approach to the process. Meaning the signals could be examined in more detail as to inclusion or exclusion, and/or the number of signals removed can be incrementally increased or decreased and the integrity of the decoded signal measured for degree of improvement or worsening of the results.

A key point of this embodiment is that ICA is used on signals it can likely identify, and is not used on the CDMA signals prior to the Rake processing, during which it would be difficult to identify and/or extract.

Another aspect of the invention is directed to hybrid minimum mean squared error matrix-pencil separation weights for blind signal separation via patterns. Reference is again directed to U.S. Pat. No. 6,931,362 in which multiple sensors are required to provide linearly independent summations signals. The '362 patent is incorporated herein by reference. The above described antenna arrays may be used instead of the multiple sensors, yet the post-processing as disclosed in the '362 patent is still applicable.

Many modifications and other embodiments of the invention will come to the mind of one skilled in the art having the benefit of the teachings presented in the foregoing descriptions and the associated drawings. In addition, other features relating to blind signal separation are disclosed in copending patent applications filed concurrently herewith and assigned to the assignee of the present invention and are entitled BLIND SIGNAL SEPARATION USING CORRELATED ANTENNA ELEMENTS, Ser. No. 11/232,500; BLIND SIGNAL SEPARATION USING POLARIZED ANTENNA ELEMENTS, Ser. No. 11/233,329; BLIND SIGNAL SEPARATION USING A COMBINATION OF CORRELATED AND UNCORRELATED ANTENNA ELEMENTS, Ser. No. 11/233,300; BLIND SIGNAL SEPARATION USING SIGNAL PATH SELECTION, Ser. No. 11/233,316; BLIND SIGNAL SEPARATION USING SPREADING CODES, Ser. No. 11/232,610; and BLIND SIGNAL SEPARATION USING I AND Q COMPONENTS, Ser. No. 11/233,307, the entire disclosures of which are incorporated herein in their entirety by reference. Therefore, it is to be understood that the invention is not to be limited to the specific embodiments disclosed, and that modifications and embodiments are intended to be included within the scope of the appended claims.

That which is claimed is:

1. A communications device for separating source signals provided by M signal sources, the communications device comprising:
   an antenna array comprising N antenna elements for generating N initial antenna patterns for receiving N different summations of the M source signals, with N being less than M;
   said antenna array comprising an elevation controller for selectively changing an elevation of at least one of the N initial antenna patterns for generating at least one additional antenna pattern so that at least one additional different summation of the M source signals is received thereby;
   a receiver connected to said antenna array for receiving the N different summations of the M source signals using the N initial antenna patterns, and for receiving the at least one additional different summation of the M source signals using the at least one additional antenna pattern; and
   a blind signal separation processor connected to said receiver for forming a mixing matrix comprising the N different summations of the M source signals and the at least one additional different summation of the M source signals, the mixing matrix having a rank equal to N plus the number of additional different summations of the M source signals received using the additional antenna patterns, said blind signal separation processor for separating desired source signals from the mixing matrix.

2. A communications device according to claim 1 wherein N=1 so that the rank of the mixing matrix is equal to 2.

3. A communications device according to claim 1 wherein said elevation controller selectively changes the elevation of the N initial antenna patterns so that N additional antenna patterns are generated for receiving N additional different summations of the M source signals, with the rank of the mixing matrix now being equal to 2N.

4. A communications device according to claim 1 wherein said elevation controller is segmented into k regions relative to said N antenna elements, each region being independently controlled for changing the elevation of the N initial antenna patterns so that N additional antenna patterns are generated for receiving N additional different summations of the M source signals, with the rank of the mixing matrix now being equal to 2 kN.

5. A communications device according to claim 1 wherein at least two of said N antenna elements are paired for different polarizations.

6. A communications device according to claim 1 wherein at least two of said N antenna elements are uncorrelated.

7. A communications device according to claim 1 wherein said N antenna elements are correlated.

8. A communications device according to claim 7 wherein said N correlated antenna elements comprise N active antenna elements so that said antenna array forms a phased array.

9. A communications device according to claim 7 wherein said N correlated antenna elements comprise at least one active antenna element, and up to N-1 passive antenna elements so that said antenna array forms a switched beam antenna.

10. A communications device according to claim 1 wherein said antenna array comprises a ground plane; and wherein said N antenna elements comprise:
   an active antenna element adjacent said ground plane;
   a plurality of passive antenna elements adjacent said ground plane, each passive antenna element comprising an upper half and a corresponding lower half,
   an upper variable reactive load connecting said upper half to said ground plane for changing an antenna pattern in azimuth;
   said elevation controller comprising a respective lower variable reactive load for each passive antenna element for connecting said lower half to said ground plane, the N antenna patterns being moved in elevation by adjusting at least one of the lower variable reactive loads.

11. A communications device according to claim 1 wherein said antenna array comprises a ground plane adjacent said N antenna elements; and wherein said elevation controller comprises a controllable RF choke coupled to said ground plane, the N antenna beams being moved in elevation by controlling said RF choke.

12. A communications device according to claim 1 wherein said antenna array forms at least N antenna beams for receiving the at least N different summations of the M source signals, each antenna beam having 3 db points down from a maximum gain point thereof providing for signal rejection in at least one direction of an approaching signal.

13. A communications device according to claim 1 wherein said antenna array forms at least one antenna pattern for receiving at least one of the N different summations of the M source signals, the at least one antenna pattern having substantially no 3 db points down from a maximum gain point thereof resulting in no signal rejection in any direction of an approaching signal.

14. A communications device according to claim 1 wherein each summation of the M source signals is linear.

15. A communications device according to claim 1 wherein said blind signal separation processor separates the desired source signals from the mixing matrix based on principal component analysis (PCA).

16. A communications device according to claim 1 wherein said blind signal separation processor separates the desired source signals from the mixing matrix based on independent component analysis (ICA).

17. A communications device according to claim 1 wherein said blind signal separation processor separates the desired source signals from the mixing matrix based on single value decomposition (SVD).

18. A method for operating a communications device for separating source signals provided by M signal sources, the communications device comprising an antenna array comprising N elements and an elevation controller connected thereto, a receiver connected to the antenna array, and a blind signal separation processor connected to the receiver, the method comprising:
  generating at the antenna array N initial antenna patterns for receiving N different summations of the M source signals, with N being less than M;
  operating the elevation controller for selectively changing an elevation of at least one of the N initial antenna patterns for generating at least one additional antenna pattern so that at least one additional different summation of the M source signals is received thereby;
  providing the N different summations of the M source signals using the N initial antenna patterns to the receiver, and providing the at least one additional different summation of the M source signals using the at least one additional antenna pattern to the receiver; and
  processing by the blind signal separation (BSS) processor the N different summations of the M source signals and the at least one additional different summation of the M source signals, the processing comprising
    forming a mixing matrix comprising the N different summations of the M source signals and the at least one additional different summation of the M source signals, the mixing matrix having a rank equal to N plus the number of additional different summations of the M source signals received using the additional antenna patterns, and
    separating desired source signals from the mixing matrix.

19. A method according to claim 18 wherein N=1 so that the rank of the mixing matrix is equal to 2.

20. A method according to claim 18 wherein the elevation controller selectively changes the elevation of the N initial antenna patterns so that N additional antenna patterns are generated for receiving N additional different summations of the M source signals, with the rank of the mixing matrix now being equal to 2N.

21. A method according to claim 18 wherein the elevation controller is segmented into k regions relative to the N antenna elements, each region being independently controlled for changing the elevation of the N initial antenna patterns so that N additional antenna patterns are generated for receiving N additional different summations of the M source signals, with the rank of the mixing matrix now being equal to 2 kN.

22. A method according to claim 18 wherein at least two of the N antenna elements are paired for different polarizations.

23. A method according to claim 18 wherein at least two of the N antenna elements are uncorrelated.

24. A method according to claim 18 wherein the N antenna elements are correlated.

25. A method according to claim 24 wherein the N correlated antenna elements comprise N active antenna elements so that the antenna array forms a phased array.

26. A method according to claim 24 wherein the N correlated antenna elements comprise at least one active antenna element, and up to N-1 passive antenna elements so that the antenna array forms a switched beam antenna.

27. A method according to claim 18 wherein the antenna array forms at least N antenna beams for receiving the at least N different summations of the M source signals, each antenna beam having 3 db points down from a maximum gain point thereof providing for signal rejection in at least one direction of an approaching signal.

28. A method according to claim 18 wherein the antenna array forms at least one antenna pattern for receiving at least one of the N different summations of the M source signals, the at least one antenna pattern having substantially no 3 db points down from a maximum gain point thereof resulting in no signal rejection in any direction of an approaching signal.

29. A method according to claim 18 wherein the blind signal separation processor separates the desired source signals from the mixing matrix based on principal component analysis (PCA).

30. A method according to claim 18 wherein the blind signal separation processor separates the desired source signals from the mixing matrix based on independent component analysis (ICA).

31. A method according to claim 18 wherein the blind signal separation processor separates the desired source signals from the mixing matrix based on single value decomposition (SVD).

* * * * *

UNITED STATES PATENT AND TRADEMARK OFFICE
CERTIFICATE OF CORRECTION

| | | |
|---|---|---|
| PATENT NO. | : 7,098,849 B2 | Page 1 of 4 |
| APPLICATION NO. | : 11/233160 | |
| DATED | : August 29, 2006 | |
| INVENTOR(S) | : Goldberg | |

It is certified that error appears in the above-identified patent and that said Letters Patent is hereby corrected as shown below:

In the Drawings:  Delete: FIG. 2
Insert: New FIG. 2

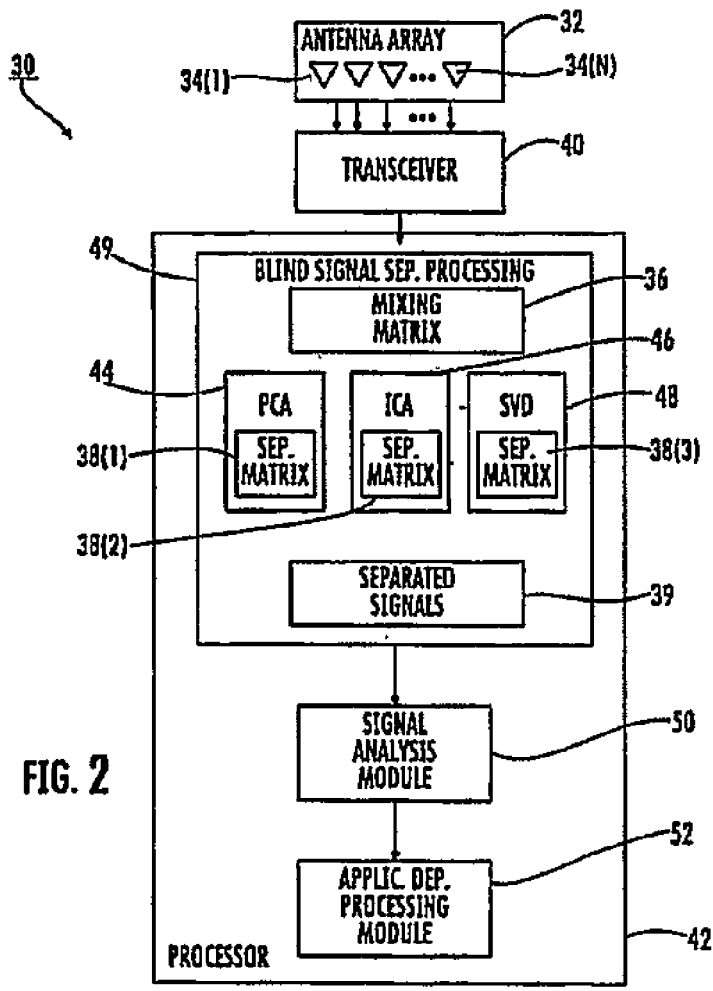

FIG. 2

UNITED STATES PATENT AND TRADEMARK OFFICE
CERTIFICATE OF CORRECTION

PATENT NO. : 7,098,849 B2
APPLICATION NO. : 11/233160
DATED : August 29, 2006
INVENTOR(S) : Goldberg It is certified that error appears in the above-identified patent and that said Letters Patent is hereby corrected as shown below:

| | |
|---|---|
| Column 1, Line 28 | Delete: "Blind source"<br>Insert: --Blind signal-- |
| Column 1, Line 36 | Delete: "Blind source"<br>Insert: --Blind signal |
| Column 4, Line 64 | Delete: "direction accordance"<br>Insert: --direction in accordance-- |
| Column 6, Line 62 | Delete: "39"<br>Insert: --39.-- |
| Column 7, Line 21 | Delete: "form"<br>Insert: --from-- |
| Column 7, Line 48 | Delete: "they" |
| Column 10, Line 53 | Delete: "is create"<br>Insert: --is to create-- |

Column 12, Line 21    Delete:

$$`` \begin{bmatrix} X_t \\ X_y \\ X_z \end{bmatrix} = \begin{bmatrix} \cos(\theta_1)\sin(\phi_1) & \cos(\theta_2)\sin(\phi_2) & \cos(\theta_3)\sin(\phi_3) \\ \sin(\theta_1)\sin(\phi_1) & \sin(\theta_2)\sin(\phi_2) & \sin(\theta_3)\sin(\phi_3) \\ \cos(\phi_1) & \cos(\phi_2) & \cos(\phi_3) \end{bmatrix} \begin{bmatrix} S_1 \\ S_2 \\ S_3 \end{bmatrix} ''$$

Insert:

$$-- \begin{bmatrix} X_x \\ X_y \\ X_z \end{bmatrix} = \begin{bmatrix} \cos(\theta_1)\sin(\phi_1) & \cos(\theta_2)\sin(\phi_2) & \cos(\theta_3)\sin(\phi_3) \\ \sin(\theta_1)\sin(\phi_1) & \sin(\theta_2)\sin(\phi_2) & \sin(\theta_3)\sin(\phi_3) \\ \cos(\phi_1) & \cos(\phi_2) & \cos(\phi_3) \end{bmatrix} \begin{bmatrix} S_1 \\ S_2 \\ S_3 \end{bmatrix} --$$

| | |
|---|---|
| Column 13, Line 61 | Delete: "replacements"<br>Insert: --replacement-- |
| Column 16, Line 67 | Delete: "dispreading"<br>Insert: --despreading-- |

UNITED STATES PATENT AND TRADEMARK OFFICE
CERTIFICATE OF CORRECTION

PATENT NO. : 7,098,849 B2
APPLICATION NO. : 11/233160
DATED : August 29, 2006
INVENTOR(S) : Goldberg It is certified that error appears in the above-identified patent and that said Letters Patent is hereby corrected as shown below:

| | |
|---|---|
| Column 17, Line 14 | Delete: "dispreading"<br>Insert: --despreading-- |
| Column 20, Line 5 | Delete: "statistically"<br>Insert: --statistical-- |
| Column 22, Line 64 | Delete: "to be begin"<br>Insert: --to begin-- |
| Column 22, Line 66 | Delete: "know"<br>Insert: --known-- |
| Column 23, Line 31 | Delete: "know"<br>Insert: --known-- |
| Column 24, Line 47 | Delete: "back the"<br>Insert: --back to the-- |
| Column 24, Line 52 | Delete: "For an"<br>Insert: --For a-- |
| Column 25, Line 46 | Delete: "can diverted"<br>Insert: --can be diverted-- |
| Column 28, Line 34 | Delete: "recognized the"<br>Insert: --recognized that the-- |

UNITED STATES PATENT AND TRADEMARK OFFICE
CERTIFICATE OF CORRECTION

PATENT NO. : 7,098,849 B2
APPLICATION NO. : 11/233160
DATED : August 29, 2006
INVENTOR(S) : Goldberg It is certified that error appears in the above-identified patent and that said Letters Patent is hereby corrected as shown below:

Column 28, Line 38    Delete: "other the other"

Signed and Sealed this

Twenty-eighth Day of August, 2007

JON W. DUDAS
*Director of the United States Patent and Trademark Office*